(12) United States Patent
Godbole et al.

(10) Patent No.: US 9,179,509 B2
(45) Date of Patent: Nov. 3, 2015

(54) LIGHT EMITTING DIODE ASSEMBLY

(75) Inventors: Kedar Godbole, San Jose, CA (US);
Hariom Rai, Milpitas, CA (US)

(73) Assignee: Google Inc., Mountain View, CA (US)

( * ) Notice: Subject to any disclaimer, the term of this patent is extended or adjusted under 35 U.S.C. 154(b) by 1131 days.

(21) Appl. No.: 12/331,223

(22) Filed: Dec. 9, 2008

(65) Prior Publication Data
US 2009/0267534 A1    Oct. 29, 2009

Related U.S. Application Data

(60) Provisional application No. 61/047,484, filed on Apr. 24, 2008, provisional application No. 61/054,072, filed on May 16, 2008.

(51) Int. Cl.
*H05B 37/02* (2006.01)
*H05B 33/08* (2006.01)

(52) U.S. Cl.
CPC .......... *H05B 33/0815* (2013.01); *Y02B 20/346* (2013.01)

(58) Field of Classification Search
USPC ............... 315/224, 291, 293, 294, 297, 307
See application file for complete search history.

(56) References Cited

U.S. PATENT DOCUMENTS

| | | | |
|---|---|---|---|
| 4,599,576 A | 7/1986 | Yoshida et al. | |
| 5,675,481 A | 10/1997 | Erisman | |
| 6,348,780 B1 | 2/2002 | Grant | |
| 6,489,809 B2 | 12/2002 | Kiehl | |
| 6,495,964 B1 * | 12/2002 | Muthu et al. | 315/149 |
| 6,696,861 B1 | 2/2004 | Baldwin et al. | |
| 6,798,152 B2 * | 9/2004 | Rooke et al. | 315/209 R |
| 6,856,103 B1 | 2/2005 | Hudson et al. | |
| 2006/0010219 A1 | 1/2006 | Saito | |
| 2007/0229001 A1 * | 10/2007 | McIntosh et al. | 315/307 |

OTHER PUBLICATIONS

U.S. Appl. No. 12/337,876: "Phase Control for Hysteretic Controller," by Kedar Godbole filed Dec. 18, 2008; 25 pages.
U.S. Appl. No. 12/838,363: "Lighting Element Failure Detection Devices and Methods for Power Switching Based Systems," by Kedar Godbole filed Jul. 16, 2010; 37 pages.
U.S. Appl. No. 12/830,560 "Lighting Assembly, Circuits and Methods," by Kedar Godbole filed Jul. 6, 2010; 66 pages.
International Search Report of the International Searching Authority, dated Mar. 23, 2009 from International Application No. PCT/US2008/087359; 3 pages.
International Written Opinion of the International Searching Authority, dated Mar. 23, 2009 from International Application No. PCT/US2008/087359; 3 pages.

* cited by examiner

*Primary Examiner* — Douglas W Owens
*Assistant Examiner* — Jonathan Cooper
(74) *Attorney, Agent, or Firm* — Edward A. Gordon; Foley & Lardner LLP

(57) ABSTRACT

A circuit in accordance with one embodiment of the invention can include a light emitting diode (LED) assembly comprising a plurality of LED channels that are controlled independently with a switch mode driver. The circuit also includes N+1 wires coupled to said LED assembly, where N is equal to the number of said plurality of LED channels of said LED assembly.

11 Claims, 10 Drawing Sheets

LIGHT EMITTING DIODE ASSEMBLY

CROSS-REFERENCE TO RELATED APPLICATIONS

This patent application claims the benefit of the U.S. Provisional Patent Application No. 61/047,484 entitled "N+1 Wire Drive Low Side Topology for LED Fixtures", by Kedar Godbole et al., filed Apr. 24, 2008, the contents of which is hereby incorporated by reference. This patent application also claims the benefit of the U.S. Provisional Patent Application No. 61/054,072 entitled "N+1 Wire Drive Low Side 10 Voltage Range Expansion Topology for LED Fixtures", by Kedar Godbole, filed May 16, 2008, the contents of which is hereby incorporated by reference.

BACKGROUND

There are different types of lighting technologies that can be utilized for illuminating indoor or outdoor space. For example, these different lighting technologies can include incandescent light bulb technology, fluorescent tube (or fluorescent lamp) technology, halogen light bulb technology, compact fluorescent lamp (CFL) technology, and light emitting diode (LED) lighting fixture technology. With regard to LED lighting fixture technology, one type of LED lighting fixture can be implemented with multiple channels of LEDs, wherein the current that flows through each LED channel can be controlled separately by a floating load Buck Converter or a standard Buck Converter. However, this type of multiple channel LED lighting fixture typically involves a considerable amount of wiring which can impose an undesirable cost burden.

SUMMARY

A circuit in accordance with one embodiment of the invention can include a light emitting diode (LED) assembly comprising a plurality of LED channels that are controlled independently with a switch mode driver. The circuit also includes N+1 wires coupled to said LED assembly, where N is equal to the number of said plurality of LED channels of said LED assembly.

While a particular embodiment in accordance with the invention has been specifically described within this Summary, it is noted that the invention is not limited in any way by this embodiment. The invention is intended to cover alternatives, modifications and equivalents which may be included within the scope of the invention as construed according to the Claims.

DETAILED DESCRIPTION

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications and equivalents, which may be included within the scope of the invention as construed according to the Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Figure 1:
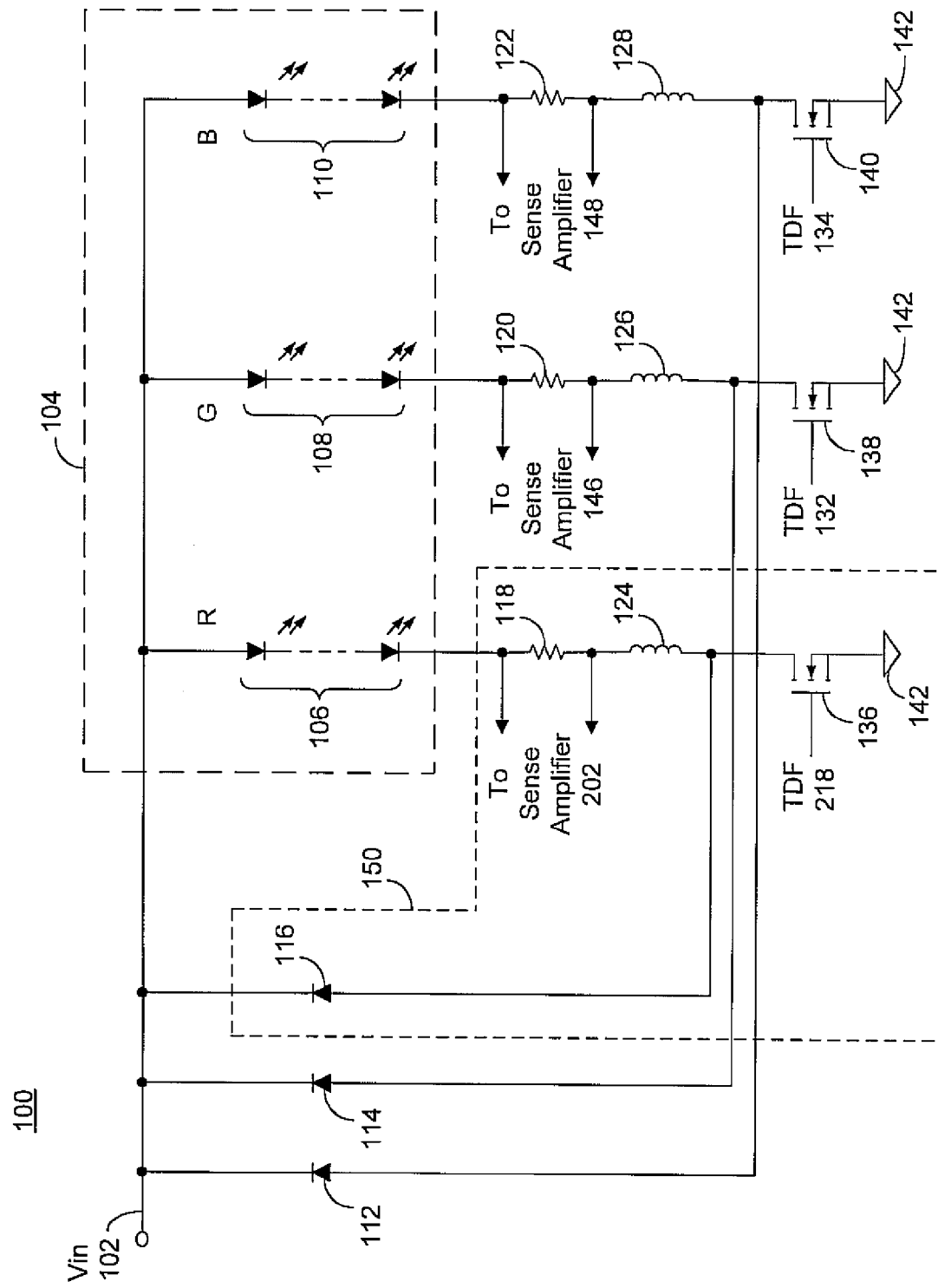
FIG. 1 is a schematic diagram of an exemplary light emitting diode (LED) drive circuit topology in accordance with various embodiments of the invention.

FIG. 1 is a schematic diagram of an exemplary light emitting diode (LED) drive circuit topology 100 in accordance with various embodiments of the invention. It is noted that in one embodiment, the LED drive circuit topology 100 can be referred to as a common anode LED assembly 104 with a low-side switch topology. Specifically, the arrangement of the elements of the LED drive circuit topology 100 can reduce the number of wires utilized for driving a multi-channel LED assembly (e.g., 104) with grounded switches (e.g., 136, 138 and 140). In one embodiment, the LED drive circuit topology 100 provides a way to power the multi-channel LED assembly 104 via (N+1) wires, where N is the number of channels of LEDs controlled with a switch mode power converter (described below). In this manner, this reduces the number of wires, and associated cost with running an N channel LED assembly for N>1. In addition, the LED drive circuit topology 100 enables a differential voltage proportional to the instantaneous current through each of inductors 124, 126 and 128 combined with a substantially steady common mode voltage at each of sense resistors 118, 120 and 122. The common mode voltage is dependent on the difference of the input voltage ($V_{IN}$) 102 and the current dependent voltage drop across each of the LED channels (e.g., 106, 108, and 110). Furthermore, it is pointed out that the LED drive circuit topology 100 in one embodiment imposes a substantially relaxed common mode voltage constraint upon the sense amplifiers (or sense circuits) 202, 146, and 148, which are not shown. Moreover, the low side switches 136, 138 and 140 of the LED drive circuit topology 100 are able to simplify the drive of these switches and are more flexible. For example, it can be used for Boost Converters. It is appreciated that in one embodiment, the sense resistor at element 118, element 120, and element 122 can be replaced with a different type of sense element with similar purpose and functionality, including permutations and combinations of various types of sense elements.

The multi-channel LED assembly 104 can include one or more LED strings or channels (e.g., 106, 108 and 110). It is pointed out that the anodes (or inputs) of the LED strings 106, 108 and 110 can be coupled together, thereby enabling the multi-channel LED assembly 104 to have a single input, which reduces the number of wires utilized within the LED drive circuit topology 100. As such, N+1 wires can be coupled to the LED assembly 104, where N is equal to the number of LED channels (e.g., 106, 108 and 110) of the LED assembly 104. For example in one embodiment, if the LED assembly 104 includes three LED channels 106, 108 and 110 (as shown), N is equal to three and the number of wires that can be coupled to the LED assembly 104 is equal to four. Specifically, in this embodiment, a first wire can be used to couple the input voltage 102 to the anodes of the LED channels 106, 108, and 110 of the LED assembly 104, a second wire can be used to couple a terminal of the sense resistor 118 to the cathode of the LED channel 106, a third wire can be used to couple a terminal of the sense resistor 120 to the cathode of the LED channel 108, and a fourth wire can be used to couple a terminal of the sense resistor 122 to the cathode of the LED channel 110. It is noted that any wire mentioned herein can be implemented in a wide variety of ways. For example in one embodiment, any wire may be implemented with an electrical conductor.

Within FIG. 1, in one embodiment, the LED strings 106, 108 and 110 can each include one or more LEDs coupled in series, but are not limited to such. In various embodiments, the LED strings 106, 108 and 110 can each include multiple LEDs that can be coupled in series, in parallel, or any combination thereof. Furthermore, the LED strings 106, 108 and 110 can each be implemented with a different color or other characteristic. For example in one embodiment, the LED string 106 can be implemented with red LEDs, the LED string 108 can be implemented with green LEDs, and the LED string 110 can be implemented with blue LEDs (as indicated within FIG. 1 by the "R", "G", and "B", respectively). When implemented in this manner, each of the LED strings can be electrically similar, in as much that they have a positive terminal (anode) and a negative terminal (cathode). They may, however, have other physical characteristics that are different, such as drive current level. In an embodiment, each of the LED strings 106, 108 and 110 can be implemented with two or more different colors. It is pointed out that the elements of the LED drive circuit topology 100 that are located outside of the LED assembly 104 can be referred to as the driver circuit, but is not limited to such.

Within FIG. 1, it is pointed out that in one embodiment, the LED drive circuit topology 100 can include the same number of switch mode power converter circuits as the number of LED channels (e.g., 106, 108 and 110) included within the LED assembly 104. Note that each switch mode power converter can also be referred to as a switch mode driver or a switch mode driver circuit, but is not limited to such. For example, the LED driver circuit topology 100 can include three switch mode power converters, but is not limited to such. For instance in one embodiment, a switch mode power converter circuit 150 can include, but is not limited to, the sense resistor 118, an inductor 124, a switching element 136, a freewheel diode 116, a sense amplifier 202 (FIG. 2), and a first controller 206 (FIG. 2), as indicated by a dashed-line enclosure. In addition, a second switch mode power converter circuit can include, but is not limited to, the sense resistor 120, an inductor 126, a switching element 138, a freewheel diode 114, a sense amplifier 146 (e.g., similar to sense amplifier 202 of FIG. 2), and a second controller (e.g., similar to controller 206 of FIG. 2). Moreover, a third switch mode power converter circuit can include, but is not limited to, the sense resistor 122, an inductor 128, a switching element 140, a freewheel diode 112, a sense amplifier 148 (e.g., similar to sense amplifier 202 of FIG. 2), and a third controller (e.g., similar to controller 206 of FIG. 2). It is noted that the diodes 112, 114 and 116 can each be referred to as a fly-back diode. Note that in one embodiment, the switch mode power converter circuits of the LED drive circuit topology 100 can be coupled to the LED assembly 104 by a set or group of wires of any length.

Within the LED drive circuit topology 100, in one embodiment, in order to separately or independently control the current flowing through each LED string of the LED assembly 104, each LED string can be coupled with a sense resistor and a switching element. Furthermore, a circuit 200 of FIG. 2 can be coupled to the sense resistor and switching element associated with each LED channel (or string). Specifically, a differential sense amplifier (or sense circuit) 202 of FIG. 2 can be coupled to each sense resistor while a controller 206 can be coupled to output a temporal density function (TDF) to each switching element. It is noted that in one embodiment a temporal density function can include a pulse density in time, but is not limited to such. Note that the sense amplifier 202 can be coupled to the controller 206. As such, the controller 206 can turn on and off the switching element via the temporal density function based on the amount of voltage detected by the sense amplifier 202, which is in turn proportional to the current through the sense resistor, and inductor.

For example in an embodiment, the cathode of the LED string 106 can be coupled with the sense resistor 118 and the switching element 136. In addition, in one embodiment, the sense amplifier 202 of FIG. 2 can be coupled to monitor the voltage across the sense resistor 118 in order to determine the amount of current flowing through it and its associated LED string 106. The controller 206 can be coupled to output a temporal density function (TDF) 218 to the switching element 136. Therefore, the controller 206 can turn on and off the switching element 136 via the temporal density function 218 based on the amount of voltage detected by the sense amplifier 202 (which is in turn proportional to the current through the sense resistor 118 and inductor 124) in order to modulate the current passing through the LED string 106. In this manner, the sense amplifier 202 and the controller 206 can maintain a substantially constant current flowing through the LED string 106.

Figure 2:
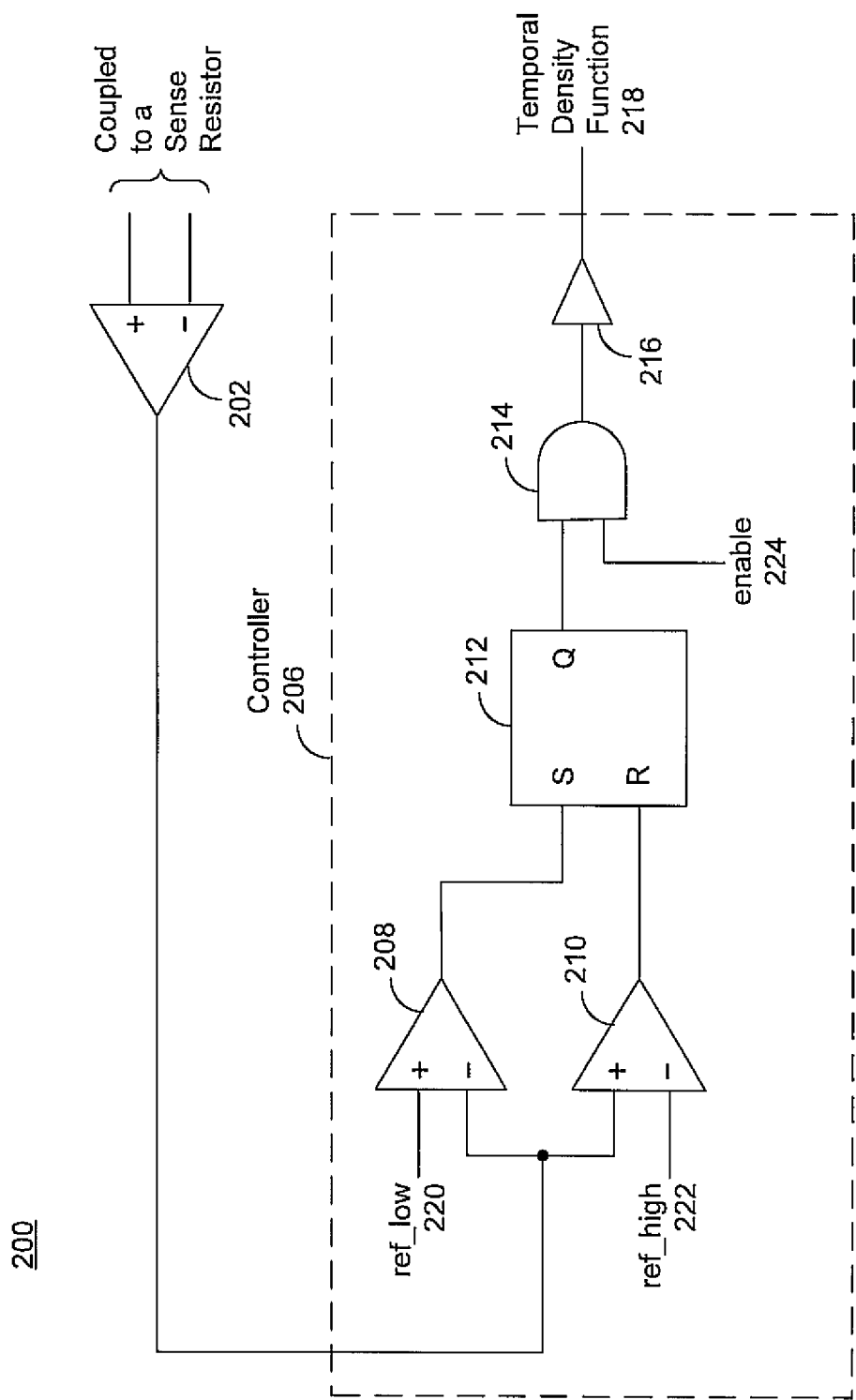
FIG. 2 illustrates an exemplary circuit of an exemplary system in accordance with various embodiments of the invention.

Within FIG. 1, it is pointed out that another circuit similar to the circuit 200 of FIG. 2 can be coupled to the sense resistor 120 and the switching element 138 in a manner similar to that described above, but is not limited to such. For example, the cathode of the LED string 108 can be coupled with the sense resistor 120 and the switching element 138. Furthermore, in one embodiment, a sense amplifier 146 (not shown) similar to the sense amplifier 202 of FIG. 2 can be coupled to monitor the voltage across the sense resistor 120 in order to determine the amount of current flowing through it and its associated LED string 108. Also, a controller similar to the controller 206 of FIG. 2 can be coupled to output a temporal density function (TDF) 132 to the switching element 138. As such, the controller can turn on and off the switching element 138 via the temporal density function 132 based on the amount of voltage detected by the sense amplifier 146 (which is in turn proportional to the current through the sense resistor 120 and inductor 126) in order to modulate the current passing through the LED string 108. In this fashion, the sense amplifier 146 and the controller can maintain a substantially constant current flowing through the LED string 108.

Moreover, it is noted that yet another circuit similar to the circuit 200 of FIG. 2 can be coupled to the sense resistor 122 and the switching element 140 in a manner similar to that described above, but is not limited to such. For example, the cathode of the LED string 110 can be coupled with the sense resistor 122 and the switching element 140. In addition, in an embodiment, a sense amplifier 148 (not shown) similar to the sense amplifier 202 of FIG. 2 can be coupled to monitor the voltage across the sense resistor 122 in order to determine the amount of current flowing through it and its associated LED string 110. Furthermore, a controller similar to the controller 206 of FIG. 2 can be coupled to output a temporal density function (TDF) 134 to the switching element 140. Therefore, the controller can turn on and off the switching element 140 via the temporal density function 134 based on the amount of voltage detected by the sense amplifier 148 (which is in turn proportional to the current through the sense resistor 122 and inductor 128) in order to modulate the current passing through the LED string 110. In this manner, the sense amplifier 148 and the controller can maintain a substantially constant current flowing through the LED string 110.

Within FIG. 1, the LED drive circuit topology 100 enables a differential voltage proportional to the instantaneous current through each of the inductors 124, 126 and 128, combined with a substantially steady common mode voltage at each of sense resistors 118, 120 and 122, respectively. The common mode voltage is dependent on the difference of the input voltage 102 and the current dependent voltage drop across each of the LED channels (e.g., 106, 108, and 110). Note that a fraction of the input voltage 102 drops across each of the LED channels 106, 108 and 110 causing the common mode voltage to be reduced that is applied to each sense amplifier (e.g., 202, 146 and 148) via the sense resistor 118, 120 and 122, respectively. As such, in an embodiment, this increases the effective drive voltage range of each of the sense amplifiers 202, 146 and 148 when driving LED channels 106, 108 and 110 (e.g., which may each include a long string of LEDs) from a high voltage supply 102. As such, the LED drive circuit topology 100 can enable an increased voltage reach of each of the sense amplifiers 202, 146 and 148.

For example, when the LEDs of the LED string 106 are conducting in the forward direction with a certain current, each one of the LEDs has a relatively fixed voltage drop across it. Therefore, the voltage that is produced at the terminal of the sense resistor 118 which is coupled to the LED string 106 is equal to the magnitude of the voltage source 102 minus the combined voltage drop across the LED string 106. For instance, given that the voltage source 102 is equal to 15 volts (V) and the LED string 106 includes seven LEDs coupled in series with each LED have a fixed voltage drop equal to 1 volt, the voltage generated at the terminal of the sense resistor 118 which is coupled to the LED string 106, is equal to:

15V−(7×1V)=8V

Furthermore, the differential voltage across the sense resistor 118 is given as the product of the resistance value of the sense resistor 118, and the current flowing through it. For example, if the sense resistor has a 0.1 ohm resistance value and a current of 1 ampere (A) flowing through it, the differential voltage is:

1 A×0.1 ohm=0.1V

Given the above example, the voltage generated at the terminal of the sense resistor 118 which is coupled to the LED string 106 is equal to 8 volts. As such, the sense amplifier 202 that is coupled to the sense resistor 118 just has to be rated to 8 volts for it to operate properly. Since the LED drive circuit topology 100 enables a lower common mode voltage at the sense resistor 118, for example, the rating of the sense amplifier 202 can be at a lower value, which is easier to design and it is less expensive. Note that the sense amplifier 202 can be rated for a common mode voltage that is lower than the input supply voltage 102. It is noted that the LED strings 108 and 110 of the LED assembly 104 can operate in a manner similar to the LED string 106, as described above. Therefore the LED drive circuit topology 100 enables a differential voltage proportional to the instantaneous current through each of the inductors 124, 126 and 128, combined with a substantially steady common mode voltage at each of sense resistors 118, 120 and 122, respectively. However, it is noted that each of the switching elements 136, 138 and 140 can experience the full voltage of the input voltage 102. As such, it is desirable in one embodiment that each of the switching elements 136, 138 and 140 be rated to the full voltage of the input voltage 102 plus some margin.

Within FIG. 1, the light emitting diode (LED) drive circuit topology 100 can include, but is not limited to, a voltage source ($V_{IN}$) 102, LED assembly 104, diodes 112, 114 and 116, sense resistors 118, 120 and 122, inductors 124, 126 and 128, and switching elements 136, 138 and 140. Specifically, the voltage source 102 can be coupled to an input terminal of the LED assembly 104 and to each output terminal (or cathode) of diodes 112, 114 and 116. It is noted that the LED assembly 104 can include one or more LED strings (e.g., 106, 108 and 110). In one embodiment, the LED strings 106, 108 and 110 can each include one or more LEDs coupled in series. The input terminal of the LED assembly 104 can be coupled to an input terminal (or anode) of the LED string 106, an input terminal (or anode) of the LED string 108, and an input terminal (or anode) of the LED string 110. A first output terminal of the LED assembly 104 can be coupled to a first terminal of the resistor 118. Note that the first output terminal of the LED assembly 104 can be an output terminal (or cathode) of the LED string 106. In addition, a second output terminal of the LED assembly 104 can be coupled to a first terminal of the resistor 120. Note that the second output terminal of the LED assembly 104 can be an output terminal (or cathode) of the LED string 108. A third output terminal of the LED assembly 104 can be coupled to a first terminal of the resistor 122. Note that the third output terminal of the LED assembly 104 can be an output terminal (or cathode) of the LED string 110.

A second terminal of resistor 118 can be coupled to a first terminal of the inductor 124. The first and second terminals of resistor 118 can be coupled to the sense amplifier 202 (FIG. 2). A second terminal of resistor 120 can be coupled to a first terminal of the inductor 126. The first and second terminals of resistor 120 can be coupled to the sense amplifier 146 (e.g., similar to sense amplifier 202 of FIG. 2). Additionally, a second terminal of resistor 122 can be coupled to a first terminal of the inductor 128. The first and second terminals of resistor 122 can be coupled to sense amplifier 148 (e.g., similar to sense amplifier 202 of FIG. 2). A second terminal of inductor 124 can be coupled to an input terminal (or anode) of the diode 116 and the drain of the transistor 136. The gate of the transistor 136 can be coupled to receive a temporal density function (TDF) 218 from a first controller (e.g., controller 206 of FIG. 2) while the source of the transistor 136 can be coupled to ground 142. A second terminal of inductor 126 can be coupled to an input terminal (or anode) of the diode 114 and the drain of the transistor 138. The gate of the transistor 138 can be coupled to receive a TDF 132 from a second controller (e.g., similar to controller 206 of FIG. 2) while the source of the transistor 138 can be coupled to ground 142. A second terminal of inductor 128 can be coupled to an input terminal (or anode) of the diode 112 and the drain of the transistor 140. The gate of the transistor 140 can be coupled to receive a TDF 134 from a third controller (e.g., similar to controller 206 of FIG. 2) while the source of the transistor 140 can be coupled to ground 142.

Within FIG. 1, it is noted that in one embodiment, the sense resistors 118, 120 and 122 of the LED drive circuit topology 100 can each be replaced with a current transformer that can monitor or sense the current flowing through the corresponding LED string (e.g., 106, 108 and 110) of the LED assembly 104. Note that each current transformer can be coupled to a controller similar to the controller 206 of FIG. 2. It is pointed out that the switching elements 136, 138 and 140 can each be implemented in a wide variety of ways. For example, the switching elements 136, 138 and 140 can each be implemented as, but is not limited to, a transistor, a NPN bipolar junction transistor (BJT), a PNP bipolar junction transistor (BJT), a P-channel MOSFET (metal-oxide semiconductor field-effect transistor) which is also known as a PMOS or PFET, an N-channel MOSFET which is also known as a NMOS or NFET. Note that when implemented as a BJT, an emitter, a base, and a collector of each of the switching elements 136, 138 and 140 can each be referred to as a terminal of the transistor. Furthermore, the base of each of the switching elements 136, 138 and 140 can also be referred to as a control terminal of the transistor. Also, when implemented as a FET, a gate, a drain, and a source of each of the switching elements 136, 138 and 140 can each be referred to as a terminal of the transistor. Additionally, the gate of each of the switching elements 136, 138 and 140 can also be referred to as a control terminal of the transistor. It is pointed out that when the switching elements 136, 138 and 140 are coupled as shown in FIG. 1, each of them can be referred to as a grounded switching element.

It is noted that the LED drive circuit topology 100 may not include all of the elements illustrated by FIG. 1. Additionally, the LED drive circuit topology 100 can be implemented to include one or more elements not illustrated by FIG. 1. It is pointed out that the LED drive circuit topology 100 can be utilized in any manner similar to that described herein, but is not limited to such.

FIG. 2 illustrates an exemplary circuit 200 of an exemplary system in accordance with various embodiments of the invention. It is pointed out that the elements of FIG. 2 having the same reference numbers as the elements of any other figure herein can operate or function in any manner similar to that described herein, but are not limited to such. The circuit 200 can include, but is not limited to, the differential sense amplifier 202 and the controller 206. It is pointed out that the circuit 200, in one embodiment, can be coupled to a sense resistor (e.g., 118) and its corresponding switching element (e.g., 136) of any LED drive circuit topology (e.g., 100, 300, 400, 500, 600 and 700) described herein. Specifically, the sense amplifier 202 and the controller 206 can be coupled to a sense resistor and its corresponding switching element, respectively, of a LED drive topology drive circuit. In this manner, the controller 206 can turn on and off the switching element (e.g., 136) via the temporal density function 218 based on the amount of voltage detected by the sense amplifier 202 in order to modulate the current passing through the LED string (e.g., 106) of the LED drive circuit topology. In this manner, the sense amplifier 202 and the controller 206 can maintain a substantially constant current flowing through the LED string.

When the sense amplifier 202 is coupled to the terminals of a sense resistor (e.g., 118) of a LED drive circuit topology, the sense amplifier 202 can receive the voltage across the sense resistor. The sense amplifier 202 then amplifies the received voltage, which it outputs to the controller 206. The comparator 208 and 210 of the controller 206 receives the voltage signal. In one embodiment, both the negative input of the comparator 208 and the positive input of the comparator 210 receive the voltage signal output by the sense amplifier 202. Specifically, the comparator 208 compares the received voltage signal to a low reference voltage (ref_low) 220 that is received at its positive input. If the comparator 208 determines that the received voltage signal is less than the low reference voltage, the comparator 208 outputs a logic 1 voltage signal that is received by the S (set) input of the SR flip-flop 212. Moreover, the comparator 210 compares the received voltage signal to a high reference voltage (ref_high) 222 that is received at its negative input. If the comparator 210 determines that the received voltage signal is more than the high reference voltage, the comparator 210 outputs a logic 1 voltage signal that is received by the R (reset) input of the SR flip-flop 212.

Within FIG. 2, it is noted that if both the S and R inputs of the SR flip-flop 212 are at a logic zero voltage, upon receipt of the logic 1 voltage signal at its S input, the Q output of the SR flip-flop 212 will output a logic 1 voltage signal to a first input of an AND logic gate 214 and then the S input will return to a logic zero voltage. Additionally, if both the S and R inputs of the SR flip-flop 212 are at a logic zero voltage, and the output Q is at a logic 1 state (or voltage), upon receipt of the logic 1 voltage signal at its R input, the Q output of the SR flip-flop 212 will output a logic zero voltage signal to the first input of the AND gate 214 causing the output of the AND gate to go to a logic zero state (or voltage). As a result, the buffer 216 will drive the temporal density function (TDF) 218 to a logic zero value (or voltage), and cause the switching element (e.g., 136) to be turned off. In one embodiment, this will cause the current to transition to the freewheel path of diode 116 (FIG. 1), and eventually decrease. As the current decreases below the high reference voltage (ref_high) 222, the comparator 210 comparison will result in a logic zero voltage, and then the R input will return to a logic zero voltage. A second input of the AND gate 214 is coupled to receive an enable signal 224. If the enable signal 224 is a logic 1 voltage signal and the AND gate 214 receives a logic 1 voltage signal from the SR flip-flop 212, the AND gate 214 will output a logic 1 voltage signal to a gate driver 216. However, if the enable signal 224 is a logic 1 voltage signal and the AND gate 214 receives a logic zero voltage signal from the SR flip-flop 212, the AND gate 214 will output a logic zero voltage signal to the gate driver 216. Moreover, if the enable signal 224 is a logic zero voltage signal and the AND gate 214 receives a logic zero voltage signal or a logic 1 voltage signal from the SR flip-flop 212, the AND gate 214 will output a logic zero voltage signal to the gate driver 216. Upon receipt of any signal from the AND gate 214, the gate driver 216 can output it as the temporal density function 218, which the gate driver 216 can drive to the switching element of the LED drive circuit topology. In this manner, the gate driver 216 of the controller 206 can turn on and off the switching element that is coupled to receive the temporal density function 218.

It is pointed out that the controller 206 of the circuit 200 can be implemented in a wide variety of ways. For example, the controller 206 can be implemented as a Hysteretic controller, a Pulse Width Modulation (PWM) modulator, Delta-Sigma or Stochstic Signal Density Modulation (SSDM) modulator, or any controller that can generate the temporal density function (TDF) 218. Note that the temporal density function (TDF) 218 output by the controller 206 can include a pulse density in time, but is not limited to such. It is noted that the controller 206 of the present embodiment has been implemented as a Hysteretic controller, but is not limited to such. In one embodiment, the controller 206 of circuit 200 can provide a dimming function to the LED string via the switching element. The sense amplifier 202 can be implemented in a wide variety of ways. For example, the sense amplifier 202 can be implemented as a differential voltage sense amplifier, a differential current sense amplifier, and the like.

Within FIG. 2, the circuit (or system) 200 can include, but is not limited to, the differential sense amplifier 202 and the controller 206. Specifically, a first input terminal (e.g., positive input) of the sense amplifier 202 can be coupled to a first terminal of a sense resistor (e.g., 118 of FIG. 1) while a second input terminal (e.g., negative input) of the sense amplifier 202 can be coupled to a second terminal of the sense resistor. Note in one embodiment that the differential sense line is the line coupling the positive input of the sense amplifier 202 with the top terminal of the sense resistor. An output terminal of the sense amplifier 202 can be coupled to an input terminal of the controller 206. Furthermore, an output terminal of the controller 206 can be coupled to output the temporal density function (TDF) 218, which in one embodiment can be received by one or more switches (e.g., 136, 138 and/or 140), but is not limited to such.

It is noted that the controller 206 can be implemented in a wide variety of ways. For example in one embodiment, the controller 206 can be implemented with a Hysteretic controller (as shown), but is not limited to such. Note that when implemented with a Hysteretic controller circuit, the controller 206 can include, but is not limited to, comparators 208 and 210, a SR latch (or SR flip-flop) 212, an AND logic gate 214, and a gate driver 216. Specifically, the input terminal of the controller 206 can be coupled to a first input terminal (e.g., negative input) of the comparator circuit 208 and to a first input terminal (e.g., positive input) of the comparator circuit 210. A second input terminal (e.g., negative input) of the comparator 210 can be coupled to receive a high reference (ref_high) 222, which can be a high current or voltage reference. Additionally, a second input terminal (e.g., positive input) of the comparator 208 can be coupled to receive a low reference (ref_low) 220, which can be a low current or voltage reference. An output of the comparator 208 can be coupled to a first input terminal (e.g., the S input) of the SR flip-flop 212 while an output of the comparator 208 can be coupled to a second input terminal (e.g., the R input) of the SR flip-flop 212. An output terminal (e.g., the Q output) of the SR flip-flop 212 can be coupled to a first input terminal of the AND gate 214. Furthermore, a second input terminal of the AND gate 214 can be coupled to receive an enable signal 224. An output terminal of the AND gate 214 can be coupled to an input terminal of the gate driver 216. An output terminal of the gate driver 216 can be coupled to the output terminal of the controller 206. It is pointed out that the output terminal of the gate driver 216 can output the temporal density function (TDF) 218.

It is noted that the circuit 200 may not include all of the elements illustrated by FIG. 2. Additionally, the circuit 200 can be implemented to include one or more elements not illustrated by FIG. 2. It is pointed out that the circuit 200 can be utilized in any manner similar to that described herein, but is not limited to such.

Figure 3:
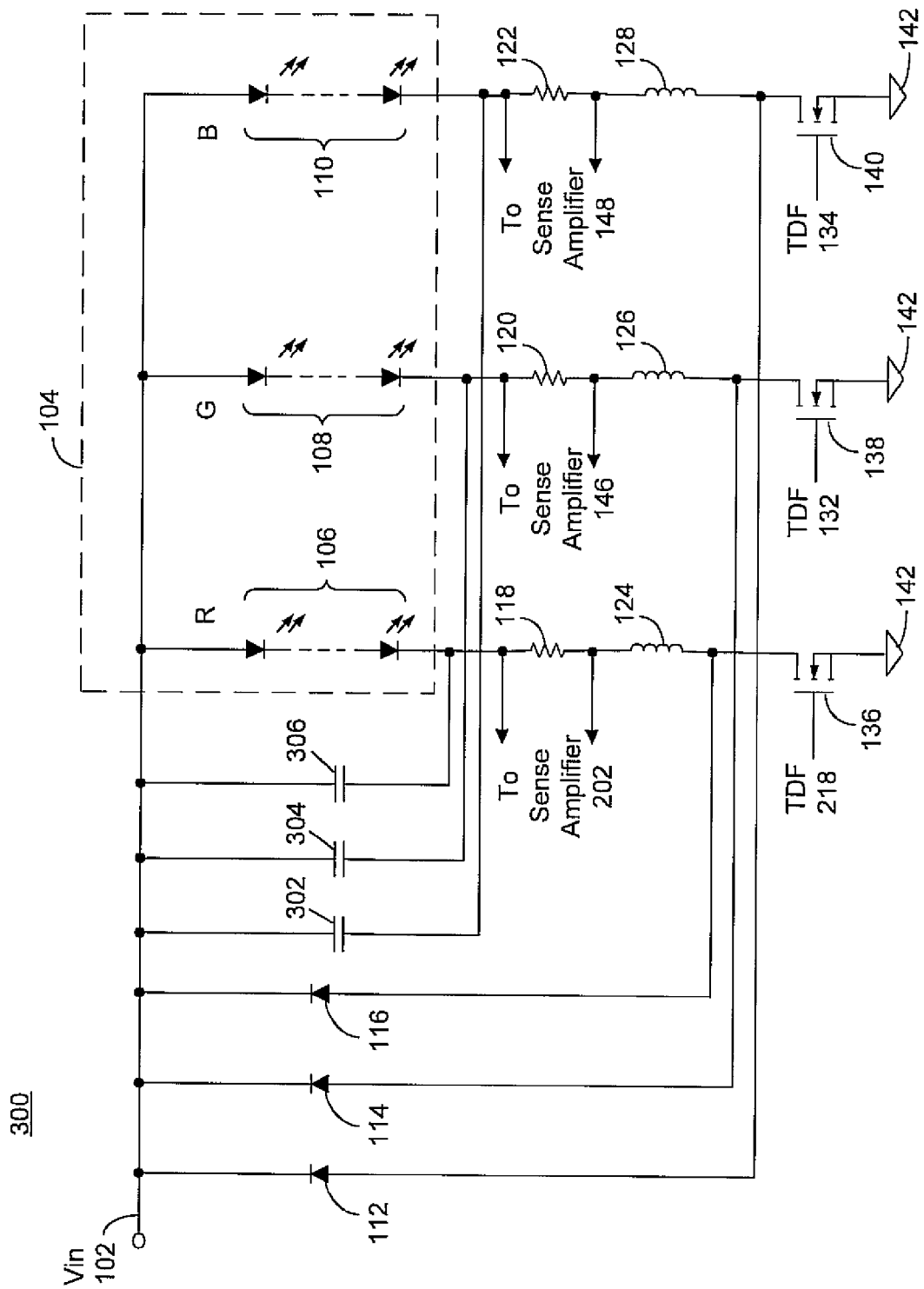
FIG. 3 is a schematic diagram of another exemplary LED drive circuit topology in accordance with various embodiments of the invention.

FIG. 3 is a schematic diagram of an exemplary LED drive circuit topology 300 in accordance with various embodiments of the invention. It is noted that in one embodiment, the LED drive circuit topology 300 can be referred to as a common anode LED assembly 104 with a low-side switch topology. It is pointed out that the elements of FIG. 3 having the same reference numbers as the elements of any other figure herein can operate or function in any manner similar to that described herein, but are not limited to such. Note that the LED drive circuit topology 300 can include, but is not limited to, a voltage source ($V_{IN}$) 102, LED assembly 104, diodes 112, 114 and 116, sense resistors 118, 120 and 122, inductors 124, 126 and 128, switching elements 136, 138 and 140, and capacitors 302, 304 and 306. The capacitor 306 can be coupled to the voltage source 102 and to the cathode of the LED string 106 of the LED assembly 104. Additionally, the capacitor 304 can be coupled to the voltage source 102 and to the cathode of the LED string 108 of the LED assembly 104. Moreover, the capacitor 302 can be coupled to the voltage source 102 and to the cathode of the LED string 110 of the LED assembly 104. When coupled in this manner, the capacitors 302, 304 and 306 can reduce ripple current and electromagnetic interference (EMI) within the LED strings 106, 108 and 110, and any interconnections such as wires, respectively.

It is pointed out that in one embodiment, the LED drive circuit topology 300 can include the same number of switch mode power converter circuits as the number of LED channels (e.g., 106, 108 and 110) included within the LED assembly 104. For example, the LED driver circuit topology 300 can include three switch mode power converter circuits, but is not limited to such. Note that each switch mode power converter can be referred to as a switch mode driver or switch mode driver circuit, but is not limited to such. For instance in one embodiment, a first switch mode power converter circuit can include, but is not limited to, the sense resistor 118, inductor 124, switching element 136, diode 116, sense amplifier 202, controller 206, and capacitor 306. Furthermore, a second switch mode power converter circuit can include, but is not limited to, the sense resistor 120, inductor 126, switching element 138, diode 114, sense amplifier 146 (e.g., similar to sense amplifier 202 of FIG. 2), a second controller (e.g., similar to controller 206 of FIG. 2), and capacitor 304. Additionally, a third switch mode power converter circuit can include, but is not limited to, the sense resistor 122, inductor 128, switching element 140, diode 112, sense amplifier 148 (e.g., similar to sense amplifier 202 of FIG. 2), a third controller (e.g., similar to controller 206 of FIG. 2), and capacitor 302. It is noted that in one embodiment, the switch mode power converter circuits of the LED drive circuit topology 300 can be coupled to the LED assembly 104 by a set or group of wires of any length.

The voltage source 102 can be coupled to an input terminal of the LED assembly 104, to each output terminal (or cathode) of diodes 112, 114 and 116, and to each first terminal of the capacitors 302, 304 and 306. It is noted that the LED assembly 104 can include one or more LED strings (e.g., 106, 108 and 110). In one embodiment, the LED strings 106, 108 and 110 can each include one or more LEDs coupled in series. The input terminal of the LED assembly 104 can be coupled to an input terminal (or anode) of the LED string 106, an input terminal (or anode) of the LED string 108, and an input terminal (or anode) of the LED string 110. A first output terminal of the LED assembly 104 can be coupled to a first terminal of the resistor 118 and to a second terminal of the capacitor 306. Note that the first output terminal of the LED assembly 104 can be an output terminal (or cathode) of the LED string 106. Furthermore, a second output terminal of the LED assembly 104 can be coupled to a first terminal of the resistor 120 and to a second terminal of the capacitor 304. Note that the second output terminal of the LED assembly 104 can be an output terminal (or cathode) of the LED string 108. A third output terminal of the LED assembly 104 can be coupled to a first terminal of the resistor 122 and to a second terminal of the capacitor 302. Note that the third output terminal of the LED assembly 104 can be an output terminal (or cathode) of the LED string 110.

Within FIG. 3, a second terminal of resistor 118 can be coupled to a first terminal of the inductor 124. The first and second terminals of resistor 118 can be coupled to the sense amplifier 202 (FIG. 2). A second terminal of resistor 120 can be coupled to a first terminal of the inductor 126. The first and second terminals of resistor 120 can be coupled to the sense amplifier 146 (e.g., similar to sense amplifier 202 of FIG. 2). Additionally, a second terminal of resistor 122 can be coupled to a first terminal of the inductor 128. The first and second terminals of resistor 122 can be coupled to sense amplifier 148 (e.g., similar to sense amplifier 202 of FIG. 2). A second terminal of inductor 124 can be coupled to an input terminal (or anode) of the diode 116 and the drain of the transistor 136. The gate of the transistor 136 can be coupled to receive a temporal density function (TDF) 218 from a first controller (e.g., 206 of FIG. 2) while the source of the transistor 136 can be coupled to ground 142. A second terminal of inductor 126 can be coupled to an input terminal (or anode) of the diode 114 and the drain of the transistor 138. The gate of the transistor 138 can be coupled to receive a TDF 132 from a second controller (e.g., similar to controller 206 of FIG. 2) while the source of the transistor 138 can be coupled to ground 142. A second terminal of inductor 128 can be coupled to an input terminal (or anode) of the diode 112 and the drain of the transistor 140. The gate of the transistor 140 can be coupled to receive a TDF 134 from a third controller (e.g., similar to controller 206 of FIG. 2) while the source of the transistor 140 can be coupled to ground 142.

It is noted that the LED drive circuit topology 300 may not include all of the elements illustrated by FIG. 3. Additionally, the LED drive circuit topology 300 can be implemented to include one or more elements not illustrated by FIG. 3. It is pointed out that the LED drive circuit topology 300 can be utilized in any manner similar to that described herein, but is not limited to such.

Figure 4:
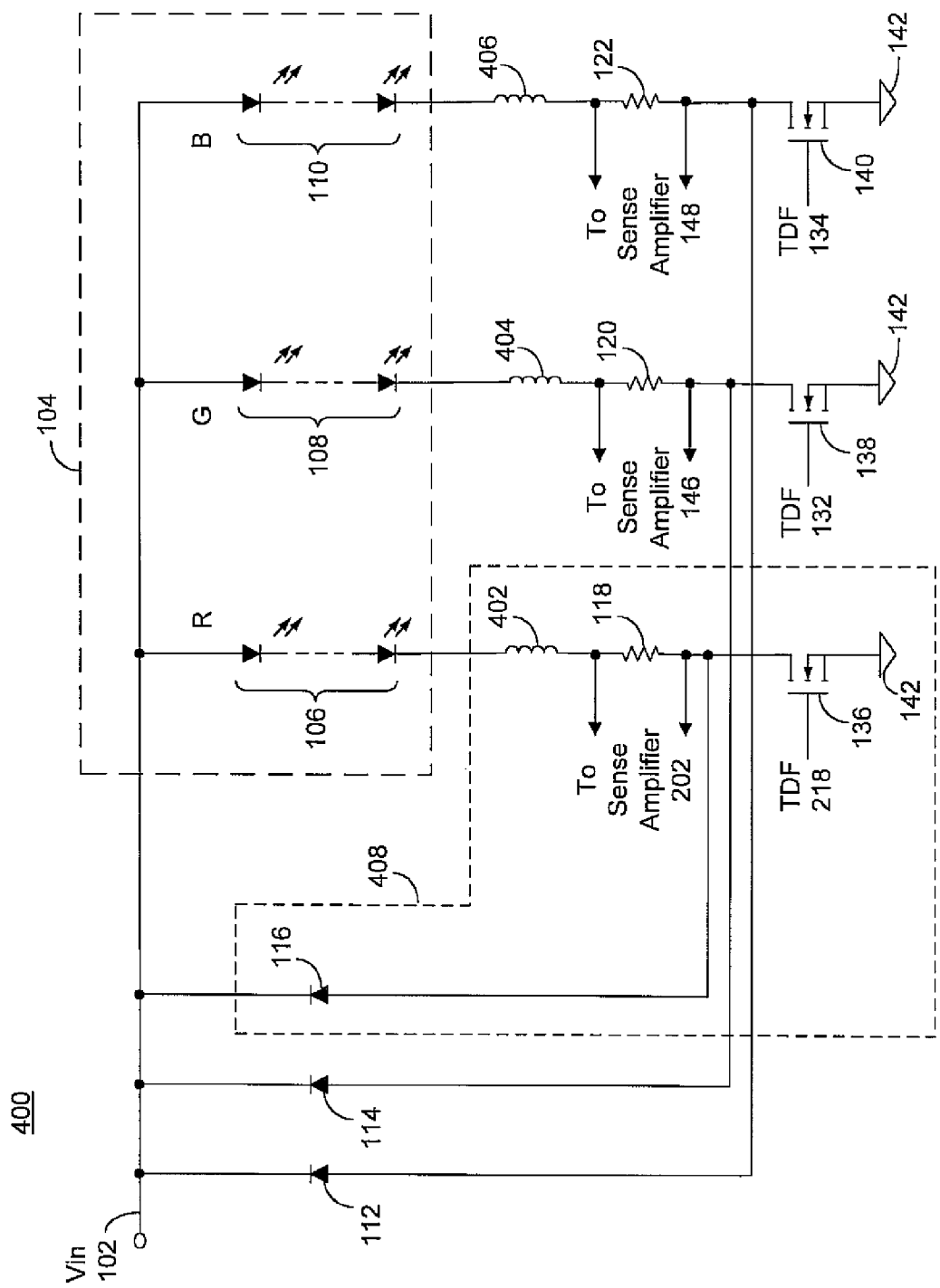
FIG. 4 is a schematic diagram of yet another exemplary LED drive circuit topology in accordance with various embodiments of the invention.

FIG. 4 is a schematic diagram of an exemplary LED drive circuit topology 400 in accordance with various embodiments of the invention. It is noted that in one embodiment, the LED drive circuit topology 400 can be referred to as a common anode LED assembly 104 with a low-side switch topology. It is pointed out that the elements of FIG. 4 having the same reference numbers as the elements of any other figure herein can operate or function in any manner similar to that described herein, but are not limited to such. Note that the LED drive circuit topology 400 can include, but is not limited to, a voltage source ($V_{IN}$) 102, LED assembly 104, diodes 112, 114 and 116, sense resistors 118, 120 and 122, inductors 402, 404 and 406, and switching elements 136, 138 and 140.

It is pointed out that in one embodiment, the LED drive circuit topology 400 can include the same number of switch mode power converter circuits as the number of LED channels (e.g., 106, 108 and 110) included within the LED assembly 104. For example, the LED driver circuit topology 400 can include three switch mode power converter circuits, but is not limited to such. Note that each switch mode power converter can also be referred to as a switch mode driver or a switch mode driver circuit, but is not limited to such. For instance in one embodiment, a first switch mode power converter circuit 408 can include, but is not limited to, the sense resistor 118, inductor 402, switching element 136, diode 116, sense amplifier 202, and controller 206, as indicated by a dashed-line enclosure. Moreover, a second switch mode power converter circuit can include, but is not limited to, the sense resistor 120, inductor 404, switching element 138, diode 114, sense amplifier 146 (e.g., similar to sense amplifier 202 of FIG. 2), a second controller (e.g., similar to controller 206 of FIG. 2). In addition, a third switch mode power converter circuit can include, but is not limited to, the sense resistor 122, inductor 406, switching element 140, diode 112, sense amplifier 148 (e.g., similar to sense amplifier 202 of FIG. 2), a third controller (e.g., similar to controller 206 of FIG. 2). It is noted that in one embodiment, the switch mode power converter circuits of the LED drive circuit topology 400 can be coupled to the LED assembly 104 by a set or group of wires of any length.

The voltage source 102 can be coupled to an input terminal of the LED assembly 104 and to each output terminal (or cathode) of diodes 112, 114 and 116. It is noted that the LED assembly 104 can include one or more LED strings (e.g., 106, 108 and 110). In one embodiment, the LED strings 106, 108 and 110 can each include one or more LEDs coupled in series. The input terminal of the LED assembly 104 can be coupled to an input terminal (or anode) of the LED string 106, an input terminal (or anode) of the LED string 108, and an input terminal (or anode) of the LED string 110. A first output terminal of the LED assembly 104 can be coupled to a first terminal of the inductor 402. Note that the first output terminal of the LED assembly 104 can be an output terminal (or cathode) of the LED string 106. In addition, a second output terminal of the LED assembly 104 can be coupled to a first terminal of the inductor 404. Note that the second output terminal of the LED assembly 104 can be an output terminal (or cathode) of the LED string 108. A third output terminal of the LED assembly 104 can be coupled to a first terminal of the inductor 406. Note that the third output terminal of the LED assembly 104 can be an output terminal (or cathode) of the LED string 110.

Within FIG. 4, a second terminal of inductor 402 can be coupled to a first terminal of the resistor 118. A second terminal of resistor 118 can be coupled to an input terminal (or anode) of the diode 116 and the drain of the transistor 136. The first and second terminals of resistor 118 can be coupled to the sense amplifier 202 (FIG. 2). A second terminal of inductor 404 can be coupled to a first terminal of the resistor 120. A second terminal of resistor 120 can be coupled to an input terminal (or anode) of the diode 114 and the drain of the transistor 138. The first and second terminals of resistor 120 can be coupled to the sense amplifier 146 (e.g., similar to sense amplifier 202 of FIG. 2). A second terminal of inductor 406 can be coupled to a first terminal of the resistor 122. A second terminal of resistor 122 can be coupled to an input terminal (or anode) of the diode 112 and the drain of the transistor 140. The first and second terminals of resistor 122 can be coupled to the sense amplifier 148 (e.g., similar to sense amplifier 202 of FIG. 2). The gate of the transistor 136 can be coupled to receive a temporal density function (TDF) 218 from a first controller (e.g., 206 of FIG. 2) while the source of the transistor 136 can be coupled to ground 142. The gate of the transistor 138 can be coupled to receive a TDF 132 from a second controller (e.g., similar to controller 206 of FIG. 2) while the source of the transistor 138 can be coupled to ground 142. The gate of the transistor 140 can be coupled to receive a TDF 134 from a third controller (e.g., similar to controller 206 of FIG. 2) while the source of the transistor 140 can be coupled to ground 142.

It is noted that the LED drive circuit topology 400 may not include all of the elements illustrated by FIG. 4. Additionally, the LED drive circuit topology 400 can be implemented to include one or more elements not illustrated by FIG. 4. It is pointed out that the LED drive circuit topology 400 can be utilized in any manner similar to that described herein, but is not limited to such.

Figure 5:
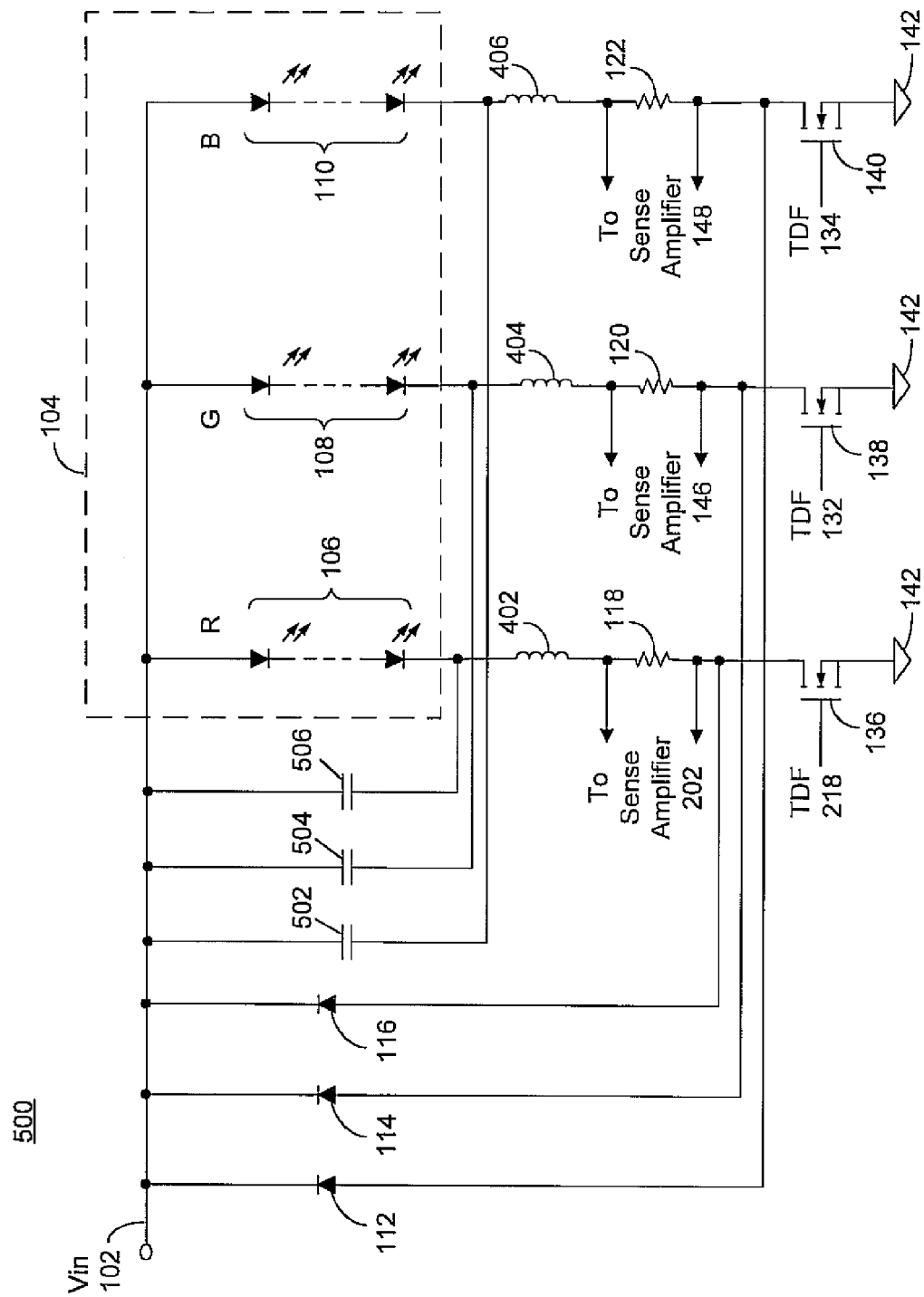
FIG. 5 is a schematic diagram of still another exemplary LED drive circuit topology in accordance with various embodiments of the invention.

FIG. 5 is a schematic diagram of an exemplary LED drive circuit topology 500 in accordance with various embodiments of the invention. It is noted that in one embodiment, the LED drive circuit topology 500 can be referred to as a common anode LED assembly 104 with a low-side switch topology. It is pointed out that the elements of FIG. 5 having the same reference numbers as the elements of any other figure herein can operate or function in any manner similar to that described herein, but are not limited to such. Note that the LED drive circuit topology 500 can include, but is not limited to, a voltage source ($V_{IN}$) 102, LED assembly 104, diodes 112, 114 and 116, sense resistors 118, 120 and 122, inductors 402, 404 and 406, switching elements 136, 138 and 140, and capacitors 502, 504 and 506. The capacitor 506 can be coupled to the voltage source 102 and to the cathode of the LED string 106 of the LED assembly 104. Furthermore, the capacitor 504 can be coupled to the voltage source 102 and to the cathode of the LED string 108 of the LED assembly 104. In addition, the capacitor 502 can be coupled to the voltage source 102 and to the cathode of the LED string 110 of the LED assembly 104. When coupled in this manner, the capacitors 502, 504 and 506 can reduce ripple current and electromagnetic interference (EMI) within the LED strings 106, 108 and 110, and any interconnections such as wires, respectively.

It is pointed out that in one embodiment, the LED drive circuit topology 500 can include the same number of switch mode power converter circuits as the number of LED channels (e.g., 106, 108 and 110) included within the LED assembly 104. For example, the LED driver circuit topology 500 can include three switch mode power converter circuits, but is not limited to such. Note that each switch mode power converter can also be referred to as a switch mode driver or a switch mode driver circuit, but is not limited to such. For instance in one embodiment, a first switch mode power converter circuit can include, but is not limited to, the sense resistor 118, inductor 402, switching element 136, diode 116, sense amplifier 202, controller 206, and capacitor 506. Additionally, a second switch mode power converter circuit can include, but is not limited to, the sense resistor 120, inductor 404, switching element 138, diode 114, sense amplifier 146 (e.g., similar to sense amplifier 202 of FIG. 2), a second controller (e.g., similar to controller 206 of FIG. 2), and capacitor 504. Furthermore, a third switch mode power converter circuit can include, but is not limited to, the sense resistor 122, inductor 406, switching element 140, diode 112, sense amplifier 148 (e.g., similar to sense amplifier 202 of FIG. 2), a third controller (e.g., similar to controller 206 of FIG. 2), and capacitor 502. It is noted that in one embodiment, the switch mode power converter circuits of the LED drive circuit topology 500 can be coupled to the LED assembly 104 by a set or group of wires of any length.

The voltage source 102 can be coupled to an input terminal of the LED assembly 104, to each output terminal (or cathode) of diodes 112, 114 and 116, and to each first terminal of the capacitors 502, 504 and 506. It is noted that the LED assembly 104 can include one or more LED strings (e.g., 106, 108 and 110). In one embodiment, the LED strings 106, 108 and 110 can each include one or more LEDs coupled in series. The input terminal of the LED assembly 104 can be coupled to an input terminal (or anode) of the LED string 106, an input terminal (or anode) of the LED string 108, and an input terminal (or anode) of the LED string 110. A first output terminal of the LED assembly 104 can be coupled to a first terminal of the inductor 402 and to a second terminal of the capacitor 506. Note that the first output terminal of the LED assembly 104 can be an output terminal (or cathode) of the LED string 106. In addition, a second output terminal of the LED assembly 104 can be coupled to a first terminal of the inductor 404 and to a second terminal of the capacitor 504. Note that the second output terminal of the LED assembly 104 can be an output terminal (or cathode) of the LED string 108. A third output terminal of the LED assembly 104 can be coupled to a first terminal of the inductor 406 and to a second terminal of the capacitor 502. Note that the third output terminal of the LED assembly 104 can be an output terminal (or cathode) of the LED string 110.

Within FIG. 5, a second terminal of inductor 402 can be coupled to a first terminal of the resistor 118. A second terminal of resistor 118 can be coupled to an input terminal (or anode) of the diode 116 and the drain of the transistor 136. The first and second terminals of resistor 118 can be coupled to the sense amplifier 202 (FIG. 2). A second terminal of inductor 404 can be coupled to a first terminal of the resistor 120. A second terminal of resistor 120 can be coupled to an input terminal (or anode) of the diode 114 and the drain of the transistor 138. The first and second terminals of resistor 120 can be coupled to the sense amplifier 146 (e.g., similar to sense amplifier 202 of FIG. 2). A second terminal of inductor 406 can be coupled to a first terminal of the resistor 122. A second terminal of resistor 122 can be coupled to an input terminal (or anode) of the diode 112 and the drain of the transistor 140. The first and second terminals of resistor 122 can be coupled to the sense amplifier 148 (e.g., similar to sense amplifier 202 of FIG. 2). The gate of the transistor 136 can be coupled to receive a temporal density function (TDF) 218 from a first controller (e.g., 206 of FIG. 2) while the source of the transistor 136 can be coupled to ground 142. The gate of the transistor 138 can be coupled to receive a TDF 132 from a second controller (e.g., similar to controller 206 of FIG. 2) while the source of the transistor 138 can be coupled to ground 142. The gate of the transistor 140 can be coupled to receive a TDF 134 from a third controller (e.g., similar to controller 206 of FIG. 2) while the source of the transistor 140 can be coupled to ground 142.

It is noted that the LED drive circuit topology 500 may not include all of the elements illustrated by FIG. 5. Additionally, the LED drive circuit topology 500 can be implemented to include one or more elements not illustrated by FIG. 5. It is pointed out that the LED drive circuit topology 500 can be utilized in any manner similar to that described herein, but is not limited to such.

Figure 6:
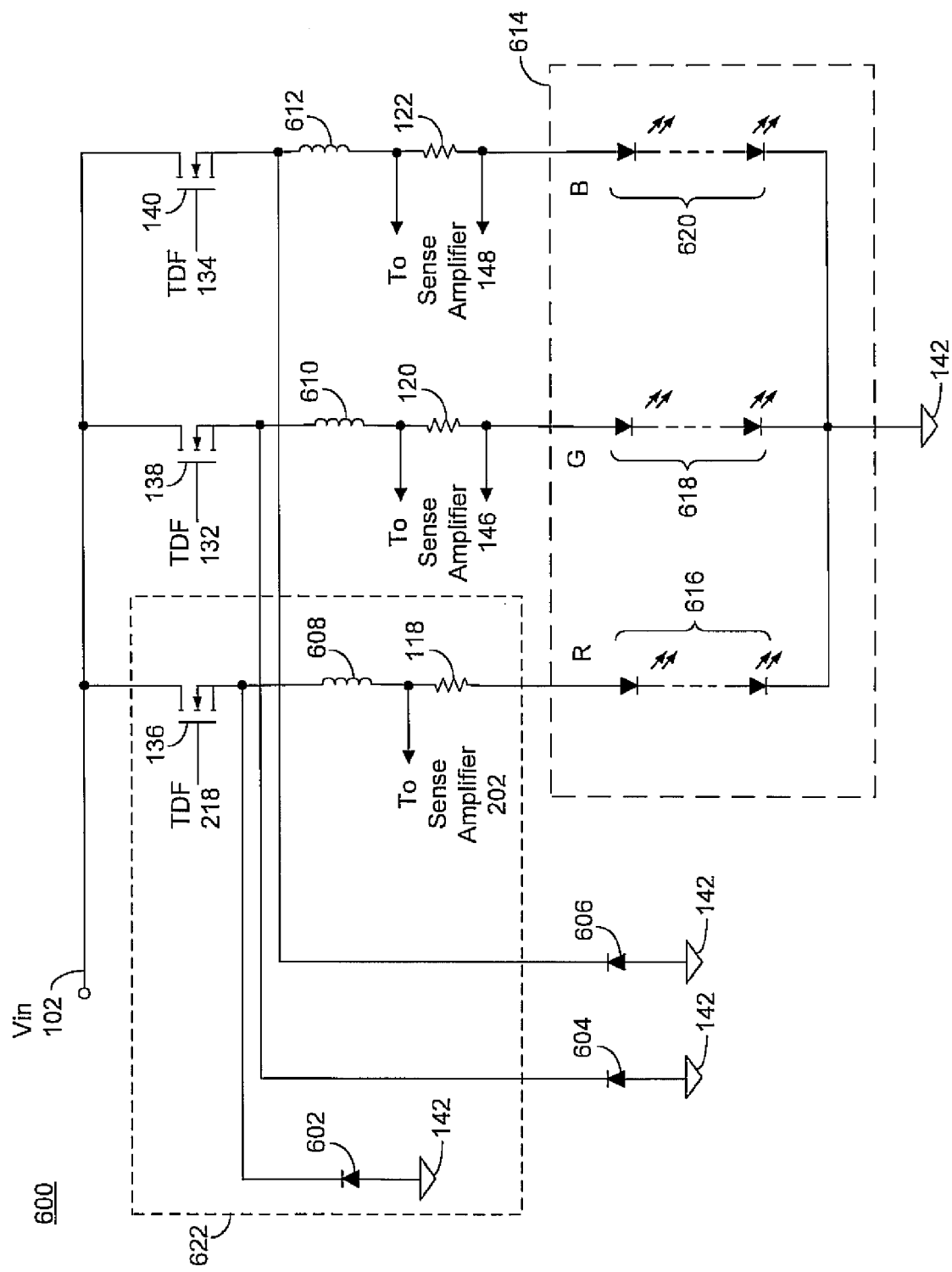
FIG. 6 is a schematic diagram of another exemplary LED drive circuit topology in accordance with various embodiments of the invention.

FIG. 6 is a schematic diagram of an exemplary LED drive circuit topology 600 in accordance with various embodiments of the invention. It is noted that in one embodiment, the LED drive circuit topology 600 can be referred to as a common cathode LED assembly 614 with a high-side switch topology. It is pointed out that the elements of FIG. 6 having the same reference numbers as the elements of any other figure herein can operate or function in any manner similar to that described herein, but are not limited to such. Note that the LED drive circuit topology 600 can include, but is not limited to, a voltage source ($V_{IN}$) 102, LED assembly 614, diodes 602, 604 and 606, sense resistors 118, 120 and 122, inductors 608, 610 and 612, and switching elements 136, 138 and 140.

It is pointed out that when the switching elements 136, 138 and 140 are coupled as shown in FIG. 6, each of them can be referred to as a high-side switching element. In one embodiment, the LED drive circuit topology 600 provides a way to power the multi-channel LED assembly 614 via (N+1) wires, where N is the number of channels of LEDs controlled with a switch mode power converter (e.g., described herein). In this manner, this reduces the number of wires, and associated cost with running an N channel LED assembly for N>1. It is appreciated that in one embodiment, the sense resistor at element 118, element 120, and element 122 can be replaced with a different type of sense element with similar purpose and functionality, including permutations and combinations of various types of sense elements.

The multi-channel LED assembly 614 can include one or more LED strings or channels (e.g., 616, 618 and 620). It is pointed out that the cathodes (or outputs) of the LED strings 616, 618 and 620 can be coupled together, thereby enabling the multi-channel LED assembly 614 to have a single output, which reduces the number of wires utilized within the LED drive circuit topology 600. As such, N+1 wires can be coupled to the LED assembly 614, where N is equal to the number of LED channels (e.g., 616, 618 and 620) of the LED assembly 614. For example in an embodiment, if the LED assembly 614 includes three LED channels 616, 618 and 620 (as shown), N is equal to three and the number of wires that can be coupled to the LED assembly 614 is equal to four. Specifically, in this embodiment, a first wire can be used to couple the ground 142 to the cathodes of the LED channels 616, 618, and 620 of the LED assembly 614, a second wire can be used to couple a terminal of the sense resistor 118 to the anode of the LED channel 616, a third wire can be used to couple a terminal of the sense resistor 120 to the anode of the LED channel 618, and a fourth wire can be used to couple a terminal of the sense resistor 122 to the anode of the LED channel 620.

Within FIG. 6, in one embodiment, the LED strings 616, 618 and 620 can each include one or more LEDs coupled in series, but are not limited to such. In various embodiments, the LED strings 616, 618 and 620 can each include multiple LEDs that can be coupled in series, in parallel, or any combination thereof. Furthermore, the LED strings 616, 618 and 620 can each be implemented with a different color or other characteristic. For example in one embodiment, the LED string 616 can be implemented with red LEDs, the LED string 618 can be implemented with green LEDs, and the LED string 620 can be implemented with blue LEDs (as indicated within FIG. 6 by the "R", "G", and "B", respectively). When implemented in this manner, each of the LED strings can be electrically similar, in as much that they have a positive terminal (anode) and a negative terminal (cathode). They may, however, have other physical characteristics that are different, such as drive current level. In an embodiment, each of the LED strings 616, 618 and 620 can be implemented with two or more different colors. It is pointed out that the elements of the LED drive circuit topology 600 that are located outside of the LED assembly 614 can be referred to as the driver circuit, but is not limited to such.

Within FIG. 6, it is pointed out that in one embodiment, the LED drive circuit topology 600 can include the same number of switch mode power converter circuits as the number of LED channels (e.g., 106, 108 and 110) included within the LED assembly 614. Note that each switch mode power converter can also be referred to as a switch mode driver or a switch mode driver circuit, but is not limited to such. For example, the LED driver circuit topology 600 can include three switch mode power converter circuits, but is not limited to such. For instance in one embodiment, a first switch mode power converter circuit 622 can include, but is not limited to, the sense resistor 118, inductor 608, switching element 136, diode 602, sense amplifier 202, and controller 206, as indicated by a dashed-line enclosure. Furthermore, a second switch mode power converter circuit can include, but is not limited to, the sense resistor 120, inductor 610, switching element 138, diode 604, sense amplifier 146 (e.g., similar to sense amplifier 202 of FIG. 2), and a second controller (e.g., similar to controller 206 of FIG. 2). Moreover, a third switch mode power converter circuit can include, but is not limited to, the sense resistor 122, inductor 612, switching element 140, diode 606, sense amplifier 148 (e.g., similar to sense amplifier 202 of FIG. 2), and a third controller (e.g., similar to controller 206 of FIG. 2). It is noted that in one embodiment, the switch mode power converter circuits of the LED drive circuit topology 600 can be coupled to the LED assembly 614 by a set or group of wires of any length.

The voltage source 102 can be coupled to the drain of each of the transistors 136, 138 and 140. The gate of the transistor 136 can be coupled to receive a temporal density function (TDF) 218 from a first controller (e.g., 206 of FIG. 2) while the source of the transistor 136 can be coupled to an output terminal (or cathode) of the diode 602 and to a first terminal of the inductor 608. The gate of the transistor 138 can be coupled to receive a TDF 132 from a second controller (e.g., similar to controller 206 of FIG. 2) while the source of the transistor 138 can be coupled to an output terminal (or cathode) of the diode 604 and to a first terminal of the inductor 610. The gate of the transistor 140 can be coupled to receive a TDF 134 from a third controller (e.g., similar to controller 206 of FIG. 2) while the source of the transistor 140 can be coupled to an output terminal (or cathode) of the diode 606 and to a first terminal of the inductor 612. An input terminal (or anode) of the diode 602 can be coupled to ground 142 while an input terminal (or anode) of the diode 604 can be coupled to ground 142. Additionally, an input terminal (or anode) of the diode 606 can be coupled to ground 142.

Within FIG. 6, a second terminal of inductor 608 can be coupled to a first terminal of the resistor 118. A second terminal of resistor 118 can be coupled to a first input terminal of the LED assembly 614. The first and second terminals of resistor 118 can be coupled to the sense amplifier 202 (FIG. 2). A second terminal of inductor 610 can be coupled to a first terminal of the resistor 120. A second terminal of resistor 120 can be coupled to a second input terminal of the LED assembly 614. The first and second terminals of resistor 120 can be coupled to the sense amplifier 146 (e.g., similar to sense amplifier 202 of FIG. 2). A second terminal of inductor 612 can be coupled to a first terminal of the resistor 122. A second terminal of resistor 122 can be coupled to a third input terminal of the LED assembly 614. The first and second terminals of resistor 122 can be coupled to the sense amplifier 148 (e.g., similar to sense amplifier 202 of FIG. 2). It is noted that the LED assembly 614 can include one or more LED strings (e.g., 616, 618 and 620). In one embodiment, the LED strings 616, 618 and 620 can each include one or more LEDs coupled in series. Note that the first input terminal of the LED assembly 614 can be an input terminal (or anode) of the LED string 616. In addition, the second input terminal of the LED assembly 614 can be an input terminal (or anode) of the LED string 618. Furthermore, the third input terminal of the LED assembly 614 can be an input terminal (or anode) of the LED string 620. An output terminal of the LED assembly 614 can be coupled to ground 142. It is pointed out that the output terminal of the LED assembly 614 can be coupled to an output terminal (or cathode) of the LED string 616, an output terminal (or cathode) of the LED string 618, and an output terminal (or cathode) of the LED string 620.

It is noted that the LED drive circuit topology 600 may not include all of the elements illustrated by FIG. 6. Additionally, the LED drive circuit topology 600 can be implemented to include one or more elements not illustrated by FIG. 6. It is pointed out that the LED drive circuit topology 600 can be utilized in any manner similar to that described herein, but is not limited to such.

Figure 7:
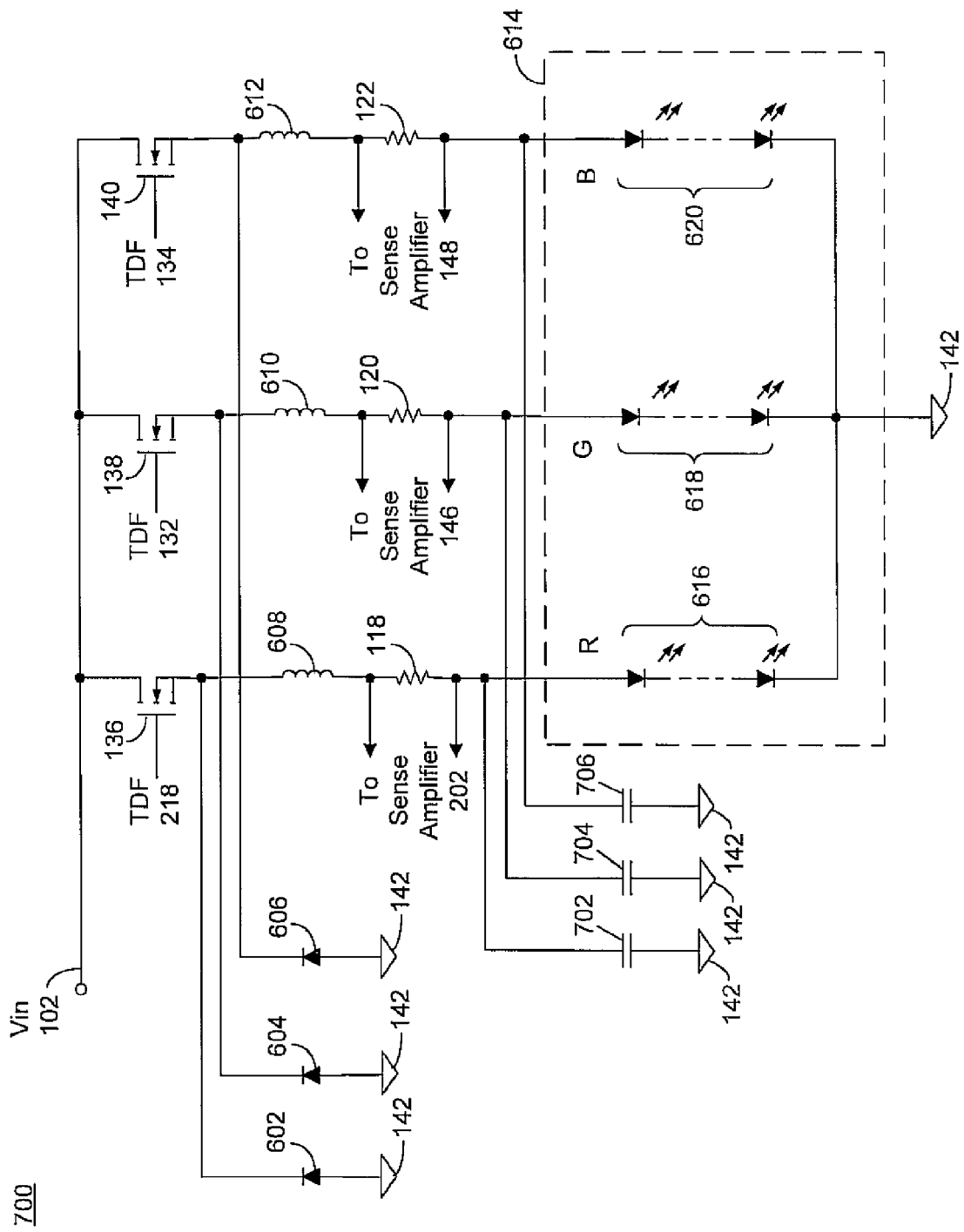
FIG. 7 is a schematic diagram of yet another exemplary LED drive circuit topology in accordance with various embodiments of the invention.

FIG. 7 is a schematic diagram of an exemplary LED drive circuit topology 700 in accordance with various embodiments of the invention. It is noted that in one embodiment, the LED drive circuit topology 700 can be referred to as a common cathode LED assembly 614 with a high-side switch topology. It is pointed out that the elements of FIG. 7 having the same reference numbers as the elements of any other figure herein can operate or function in any manner similar to that described herein, but are not limited to such. Note that the LED drive circuit topology 700 can include, but is not limited to, a voltage source ($V_{IN}$) 102, LED assembly 614, diodes 602, 604 and 606, sense resistors 118, 120 and 122, inductors 608, 610 and 612, switching elements 136, 138 and 140, and capacitors 702, 704 and 706. The capacitor 702 can be coupled to the ground 142 and to the anode of the LED string 616 of the LED assembly 614. Furthermore, the capacitor 704 can be coupled to the ground 142 and to the anode of the LED string 618 of the LED assembly 614. In addition, the capacitor 706 can be coupled to the ground 142 and to the anode of the LED string 620 of the LED assembly 614. When coupled in this manner, the capacitors 702, 704 and 706 can reduce ripple current and electromagnetic interference (EMI) within the LED strings 616, 618 and 620, respectively, and any interconnections such as wires.

It is pointed out that in one embodiment, the LED drive circuit topology 700 can include the same number of switch mode power converter circuits as the number of LED channels (e.g., 106, 108 and 110) included within the LED assembly 614. It is noted that each switch mode power converter can also be referred to as a switch mode driver or a switch mode driver circuit, but is not limited to such. For example, the LED driver circuit topology 700 can include three switch mode power converter circuits, but is not limited to such. For instance in one embodiment, a first switch mode power converter circuit can include, but is not limited to, the sense resistor 118, inductor 608, switching element 136, diode 602, sense amplifier 202, controller 206, and capacitor 702. In addition, a second switch mode power converter circuit can include, but is not limited to, the sense resistor 120, inductor 610, switching element 138, diode 604, sense amplifier 146 (e.g., similar to sense amplifier 202 of FIG. 2), a second controller (e.g., similar to controller 206 of FIG. 2), and capacitor 704. Moreover, a third switch mode power converter circuit can include, but is not limited to, the sense resistor 122, inductor 612, switching element 140, diode 606, sense amplifier 148 (e.g., similar to sense amplifier 202 of FIG. 2), a third controller (e.g., similar to controller 206 of FIG. 2), and capacitor 706. It is noted that in one embodiment, the switch mode power converter circuits of the LED drive circuit topology 700 can be coupled to the LED assembly 614 by a set or group of wires of any length.

The voltage source 102 can be coupled to the drain of each of the transistors 136, 138 and 140. The gate of the transistor 136 can be coupled to receive a temporal density function (TDF) 218 from a first controller (e.g., 206 of FIG. 2) while the source of the transistor 136 can be coupled to an output terminal (or cathode) of the diode 602 and to a first terminal of the inductor 608. The gate of the transistor 138 can be coupled to receive a TDF 132 from a second controller (e.g., similar to controller 206 of FIG. 2) while the source of the transistor 138 can be coupled to an output terminal (or cathode) of the diode 604 and to a first terminal of the inductor 610. The gate of the transistor 140 can be coupled to receive a TDF 134 from a third controller (e.g., similar to controller 206 of FIG. 2) while the source of the transistor 140 can be coupled to an output terminal (or cathode) of the diode 606 and to a first terminal of the inductor 612. An input terminal (or anode) of the diode 602 can be coupled to ground 142 while an input terminal (or anode) of the diode 604 can be coupled to ground 142. Additionally, an input terminal (or anode) of the diode 606 can be coupled to ground 142.

A second terminal of inductor 608 can be coupled to a first terminal of the resistor 118. A second terminal of resistor 118 can be coupled to a first input terminal of the LED assembly 614 and to a first terminal of the capacitor 702. The first and second terminals of resistor 118 can be coupled to the sense amplifier 202 (FIG. 2). A second terminal of inductor 610 can be coupled to a first terminal of the resistor 120. A second terminal of resistor 120 can be coupled to a second input terminal of the LED assembly 614 and to a first terminal of the capacitor 704. The first and second terminals of resistor 120 can be coupled to the sense amplifier 146 (e.g., similar to sense amplifier 202 of FIG. 2). A second terminal of inductor 612 can be coupled to a first terminal of the resistor 122. A second terminal of resistor 122 can be coupled to a third input terminal of the LED assembly 614 and to a first terminal of the capacitor 706. The first and second terminals of resistor 122 can be coupled to the sense amplifier 148 (e.g., similar to sense amplifier 202 of FIG. 2). It is noted that the LED assembly 614 can include one or more LED strings (e.g., 616, 618 and 620). In one embodiment, the LED strings 616, 618 and 620 can each include one or more LEDs coupled in series. Note that the first input terminal of the LED assembly 614 can be an input terminal (or anode) of the LED string 616. In addition, the second input terminal of the LED assembly 614 can be an input terminal (or anode) of the LED string 618. Furthermore, the third input terminal of the LED assembly 614 can be an input terminal (or anode) of the LED string 620. An output terminal of the LED assembly 614 can be coupled to ground 142. It is pointed out that the output terminal of the LED assembly 614 can be coupled to an output terminal (or cathode) of the LED string 616, an output terminal (or cathode) of the LED string 618, and an output terminal (or cathode) of the LED string 620. A second terminal of the capacitor 702 can be coupled to ground 142 while a second terminal of the capacitor 704 can be coupled to ground 142. Furthermore, a second terminal of the capacitor 706 can be coupled to ground 142.

It is noted that the LED drive circuit topology 700 may not include all of the elements illustrated by FIG. 7. Additionally, the LED drive circuit topology 700 can be implemented to include one or more elements not illustrated by FIG. 7. It is pointed out that the LED drive circuit topology 700 can be utilized in any manner similar to that described herein, but is not limited to such.

Figure 8:
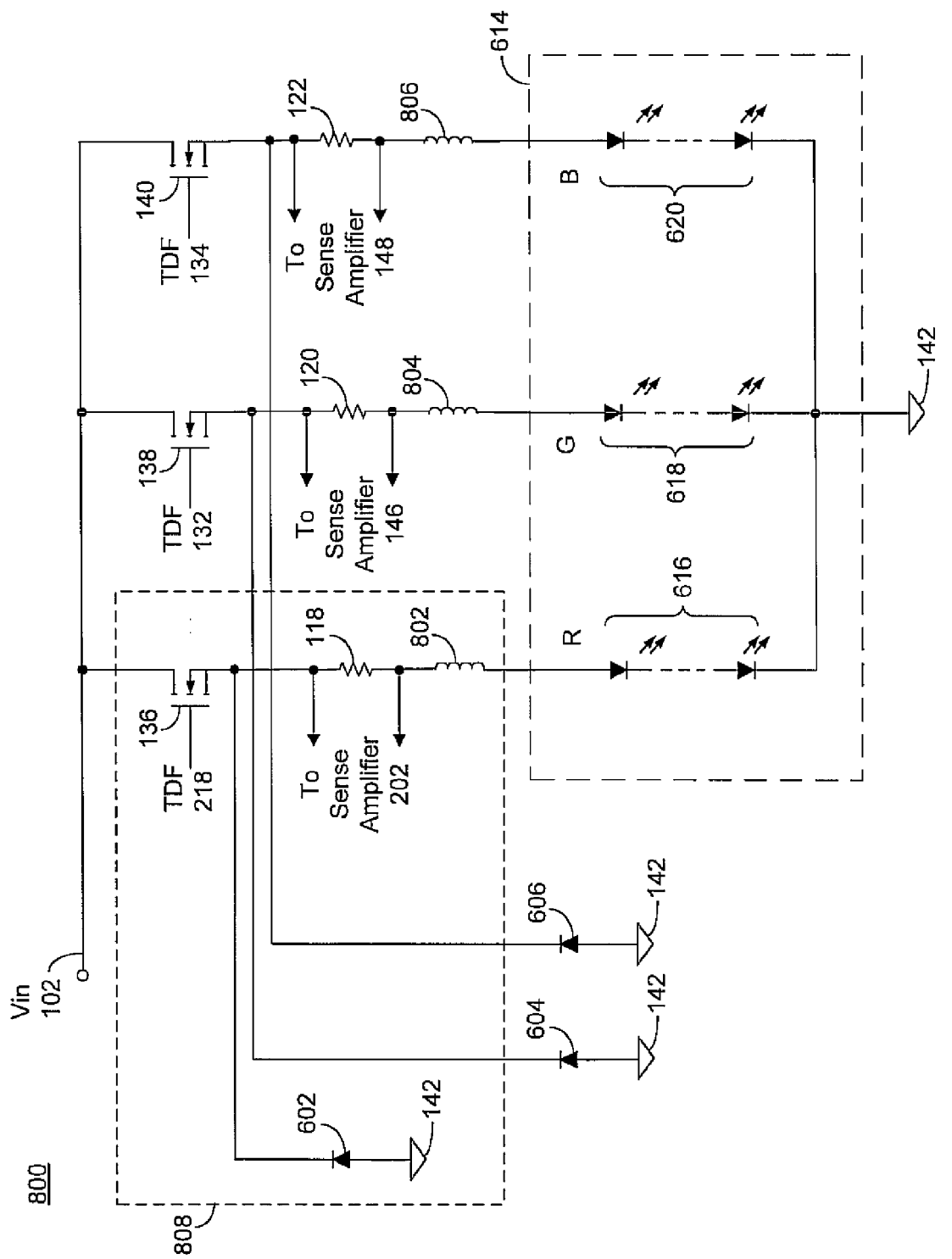
FIG. 8 is a schematic diagram of still another exemplary LED drive circuit topology in accordance with various embodiments of the invention.

FIG. 8 is a schematic diagram of an exemplary LED drive circuit topology 800 in accordance with various embodiments of the invention. It is noted that in one embodiment, the LED drive circuit topology 800 can be referred to as a common cathode LED assembly 614 with a high-side switch topology. It is pointed out that the elements of FIG. 8 having the same reference numbers as the elements of any other figure herein can operate or function in any manner similar to that described herein, but are not limited to such. Note that the LED drive circuit topology 800 can include, but is not limited to, a voltage source ($V_{IN}$) 102, LED assembly 614, diodes 602, 604 and 606, sense resistors 118, 120 and 122, inductors 802, 804 and 806, and switching elements 136, 138 and 140. It is pointed out that when the switching elements 136, 138 and 140 are coupled as shown in FIG. 8, each of them can be referred to as a high side switching element.

It is pointed out that in one embodiment, the LED drive circuit topology 800 can include the same number of switch mode power converter circuits as the number of LED channels (e.g., 106, 108 and 110) included within the LED assembly 614. It is noted that each switch mode power converter can also be referred to as a switch mode driver or a switch mode driver circuit, but is not limited to such. For example, the LED driver circuit topology 800 can include three switch mode power converter circuits, but is not limited to such. For instance in one embodiment, a first switch mode power converter circuit 808 can include, but is not limited to, the sense resistor 118, inductor 802, switching element 136, diode 602, sense amplifier 202, and controller 206, as indicated by a dashed-line enclosure. Moreover, a second switch mode power converter circuit can include, but is not limited to, the sense resistor 120, inductor 804, switching element 138, diode 604, sense amplifier 146 (e.g., similar to sense amplifier 202 of FIG. 2), and a second controller (e.g., similar to controller 206 of FIG. 2). In addition, a third switch mode power converter circuit can include, but is not limited to, the sense resistor 122, inductor 806, switching element 140, diode 606, sense amplifier 148 (e.g., similar to sense amplifier 202 of FIG. 2), and a third controller (e.g., similar to controller 206 of FIG. 2). It is noted that in one embodiment, the switch mode power converter circuits of the LED drive circuit topology 800 can be coupled to the LED assembly 614 by a set or group of wires of any length.

The voltage source 102 can be coupled to the drain of each of the transistors 136, 138 and 140. The gate of the transistor 136 can be coupled to receive a temporal density function (TDF) 218 from a first controller (e.g., 206 of FIG. 2) while the source of the transistor 136 can be coupled to an output terminal (or cathode) of the diode 602 and to a first terminal of the resistor 118. The gate of the transistor 138 can be coupled to receive a TDF 132 from a second controller (e.g., similar to controller 206 of FIG. 2) while the source of the transistor 138 can be coupled to an output terminal (or cathode) of the diode 604 and to a first terminal of the resistor 120. The gate of the transistor 140 can be coupled to receive a TDF 134 from a third controller (e.g., similar to controller 206 of FIG. 2) while the source of the transistor 140 can be coupled to an output terminal (or cathode) of the diode 606 and to a first terminal of the resistor 122. An input terminal (or anode) of the diode 602 can be coupled to ground 142 while an input terminal (or anode) of the diode 604 can be coupled to ground 142. Additionally, an input terminal (or anode) of the diode 606 can be coupled to ground 142.

A second terminal of the resistor 118 can be coupled to a first terminal of an inductor 802. The first and second terminals of resistor 118 can be coupled to the sense amplifier 202 (FIG. 2). A second terminal of the inductor 802 can be coupled to a first input terminal of the LED assembly 614. A second terminal of the resistor 120 can be coupled to a first terminal of an inductor 804. The first and second terminals of resistor 120 can be coupled to the sense amplifier 146 (e.g., similar to sense amplifier 202 of FIG. 2). A second terminal of the inductor 804 can be coupled to a second input terminal of the LED assembly 614. A second terminal of the resistor 122 can be coupled to a first terminal of an inductor 806. The first and second terminals of resistor 122 can be coupled to the sense amplifier 148 (e.g., similar to sense amplifier 202 of FIG. 2). A second terminal of the inductor 806 can be coupled to a third input terminal of the LED assembly 614. It is noted that the LED assembly 614 can include one or more LED strings (e.g., 616, 618 and 620). In one embodiment, the LED strings 616, 618 and 620 can each include one or more LEDs coupled in series. Note that the first input terminal of the LED assembly 614 can be an input terminal (or anode) of the LED string 616. In addition, the second input terminal of the LED assembly 614 can be an input terminal (or anode) of the LED string 618. Furthermore, the third input terminal of the LED assembly 614 can be an input terminal (or anode) of the LED string 620. An output terminal of the LED assembly 614 can be coupled to ground 142. It is pointed out that the output terminal of the LED assembly 614 can be coupled to an output terminal (or cathode) of the LED string 616, an output terminal (or cathode) of the LED string 618, and an output terminal (or cathode) of the LED string 620.

It is noted that the LED drive circuit topology 800 may not include all of the elements illustrated by FIG. 8. Additionally, the LED drive circuit topology 800 can be implemented to include one or more elements not illustrated by FIG. 8. It is pointed out that the LED drive circuit topology 800 can be utilized in any manner similar to that described herein, but is not limited to such.

Figure 9:
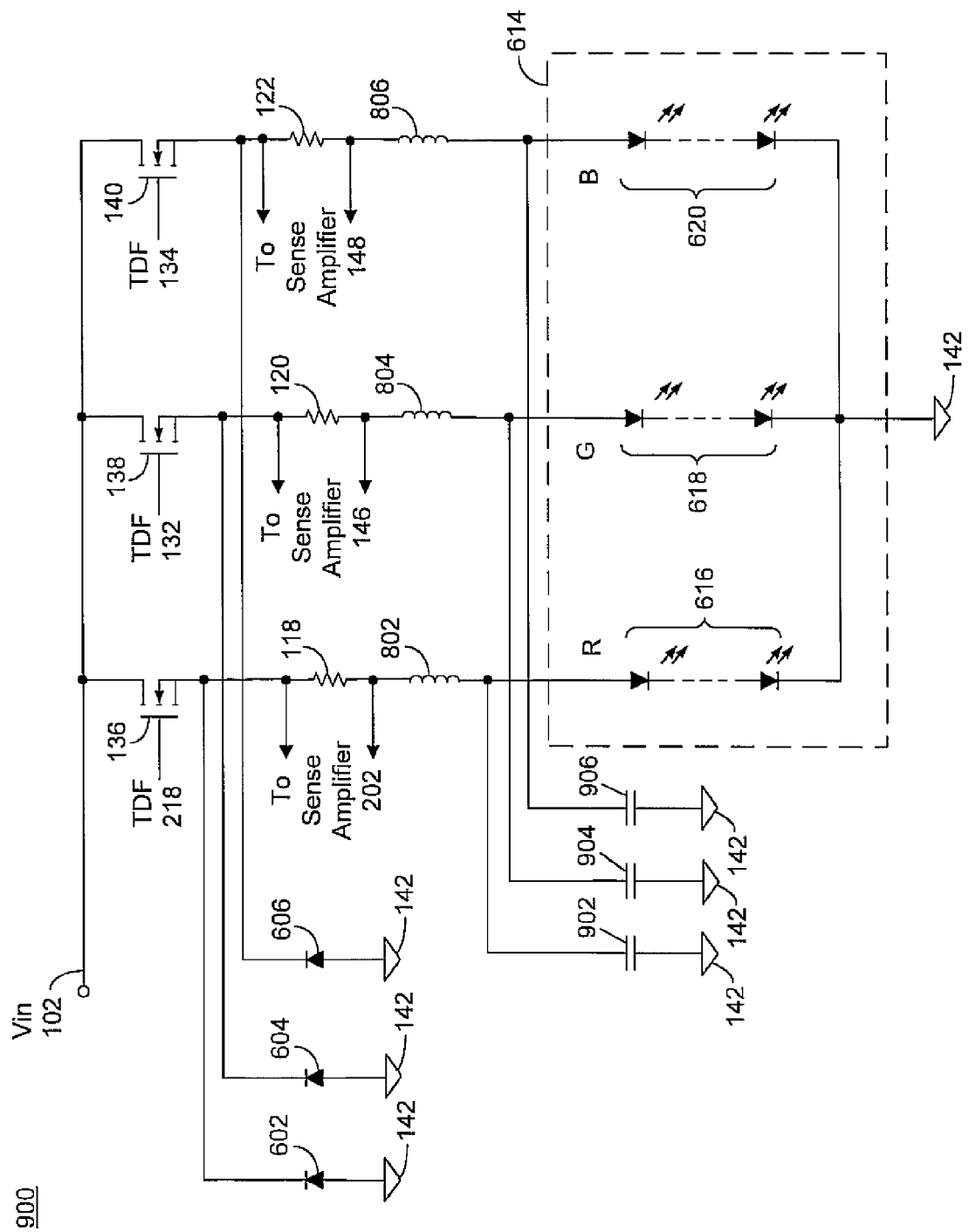
FIG. 9 is a schematic diagram of another exemplary LED drive circuit topology in accordance with various embodiments of the invention.

FIG. 9 is a schematic diagram of an exemplary LED drive circuit topology 900 in accordance with various embodiments of the invention. It is noted that in one embodiment, the LED drive circuit topology 900 can be referred to as a common cathode LED assembly 614 with a high-side switch topology. It is pointed out that the elements of FIG. 9 having the same reference numbers as the elements of any other figure herein can operate or function in any manner similar to that described herein, but are not limited to such. Note that the LED drive circuit topology 900 can include, but is not limited to, a voltage source ($V_{IN}$) 102, LED assembly 614, diodes 602, 604 and 606, sense resistors 118, 120 and 122, inductors 802, 804 and 806, switching elements 136, 138 and 140, and capacitors 902, 904 and 906. It is pointed out that when the switching elements 136, 138 and 140 are coupled as shown in FIG. 9, each of them can be referred to as a high side switching element. The capacitor 902 can be coupled to the ground 142 and to the anode of the LED string 616 of the LED assembly 614. Furthermore, the capacitor 904 can be coupled to the ground 142 and to the anode of the LED string 618 of the LED assembly 614. In addition, the capacitor 906 can be coupled to the ground 142 and to the anode of the LED string 620 of the LED assembly 614. When coupled in this manner, the capacitors 902, 904 and 906 can reduce ripple current and electromagnetic interference (EMI) within the LED strings 616, 618 and 620, respectively, and any interconnections such as wires.

It is pointed out that in one embodiment, the LED drive circuit topology 900 can include the same number of switch mode power converter circuits as the number of LED channels (e.g., 106, 108 and 110) included within the LED assembly 614. Note that each switch mode power converter can also be referred to as a switch mode driver or a switch mode driver circuit, but is not limited to such. For example, the LED driver circuit topology 900 can include three switch mode power converter circuits, but is not limited to such. For instance in one embodiment, a first switch mode power converter circuit can include, but is not limited to, the sense resistor 118, inductor 802, switching element 136, diode 602, sense amplifier 202, controller 206, and capacitor 902. Additionally, a second switch mode power converter circuit can include, but is not limited to, the sense resistor 120, inductor 804, switching element 138, diode 604, sense amplifier 146 (e.g., similar to sense amplifier 202 of FIG. 2), a second controller (e.g., similar to controller 206 of FIG. 2), and capacitor 904. Furthermore, a third switch mode power converter circuit can include, but is not limited to, the sense resistor 122, inductor 806, switching element 140, diode 606, sense amplifier 148 (e.g., similar to sense amplifier 202 of FIG. 2), a third controller (e.g., similar to controller 206 of FIG. 2), and capacitor 906. It is noted that in one embodiment, the switch mode power converter circuits of the LED drive circuit topology 900 can be coupled to the LED assembly 614 by a set or group of wires of any length.

The voltage source 102 can be coupled to the drain of each of the transistors 136, 138 and 140. The gate of the transistor 136 can be coupled to receive a temporal density function (TDF) 218 from a first controller (e.g., 206 of FIG. 2) while the source of the transistor 136 can be coupled to an output terminal (or cathode) of the diode 602 and to a first terminal of the resistor 118. The gate of the transistor 138 can be coupled to receive a TDF 132 from a second controller (e.g., similar to controller 206 of FIG. 2) while the source of the transistor 138 can be coupled to an output terminal (or cathode) of the diode 604 and to a first terminal of the resistor 120. The gate of the transistor 140 can be coupled to receive a TDF 134 from a third controller (e.g., similar to controller 206 of FIG. 2) while the source of the transistor 140 can be coupled to an output terminal (or cathode) of the diode 606 and to a first terminal of the resistor 122. An input terminal (or anode) of the diode 602 can be coupled to ground 142 while an input terminal (or anode) of the diode 604 can be coupled to ground 142. Additionally, an input terminal (or anode) of the diode 606 can be coupled to ground 142.

A second terminal of the resistor 118 can be coupled to a first terminal of an inductor 802. The first and second terminals of resistor 118 can be coupled to the sense amplifier 202 (FIG. 2). A second terminal of the inductor 802 can be coupled to a first terminal of the capacitor 902 and a first input terminal of the LED assembly 614. A second terminal of the resistor 120 can be coupled to a first terminal of an inductor 804. The first and second terminals of resistor 120 can be coupled to the sense amplifier 146 (e.g., similar to sense amplifier 202 of FIG. 2). A second terminal of the inductor 804 can be coupled to a first terminal of the capacitor 904 and a second input terminal of the LED assembly 614. A second terminal of the resistor 122 can be coupled to a first terminal of an inductor 806. The first and second terminals of resistor 122 can be coupled to the sense amplifier 148 (e.g., similar to sense amplifier 202 of FIG. 2). A second terminal of the inductor 806 can be coupled to a first terminal of the capacitor 906 and a third input terminal of the LED assembly 614. It is noted that the LED assembly 614 can include one or more LED strings (e.g., 616, 618 and 620). In one embodiment, the LED strings 616, 618 and 620 can each include one or more LEDs coupled in series. Note that the first input terminal of the LED assembly 614 can be an input terminal (or anode) of the LED string 616. In addition, the second input terminal of the LED assembly 614 can be an input terminal (or anode) of the LED string 618. Furthermore, the third input terminal of the LED assembly 614 can be an input terminal (or anode) of the LED string 620. An output terminal of the LED assembly 614 can be coupled to ground 142. It is pointed out that the output terminal of the LED assembly 614 can be coupled to an output terminal (or cathode) of the LED string 616, an output terminal (or cathode) of the LED string 618, and an output terminal (or cathode) of the LED string 620. A second terminal of the capacitor 902 can be coupled to ground 142 while a second terminal of the capacitor 904 can be coupled to ground 142. Furthermore, a second terminal of the capacitor 906 can be coupled to ground 142.

It is noted that the LED drive circuit topology 900 may not include all of the elements illustrated by FIG. 9. Additionally, the LED drive circuit topology 900 can be implemented to include one or more elements not illustrated by FIG. 9. It is pointed out that the LED drive circuit topology 900 can be utilized in any manner similar to that described herein, but is not limited to such.

Figure 10:
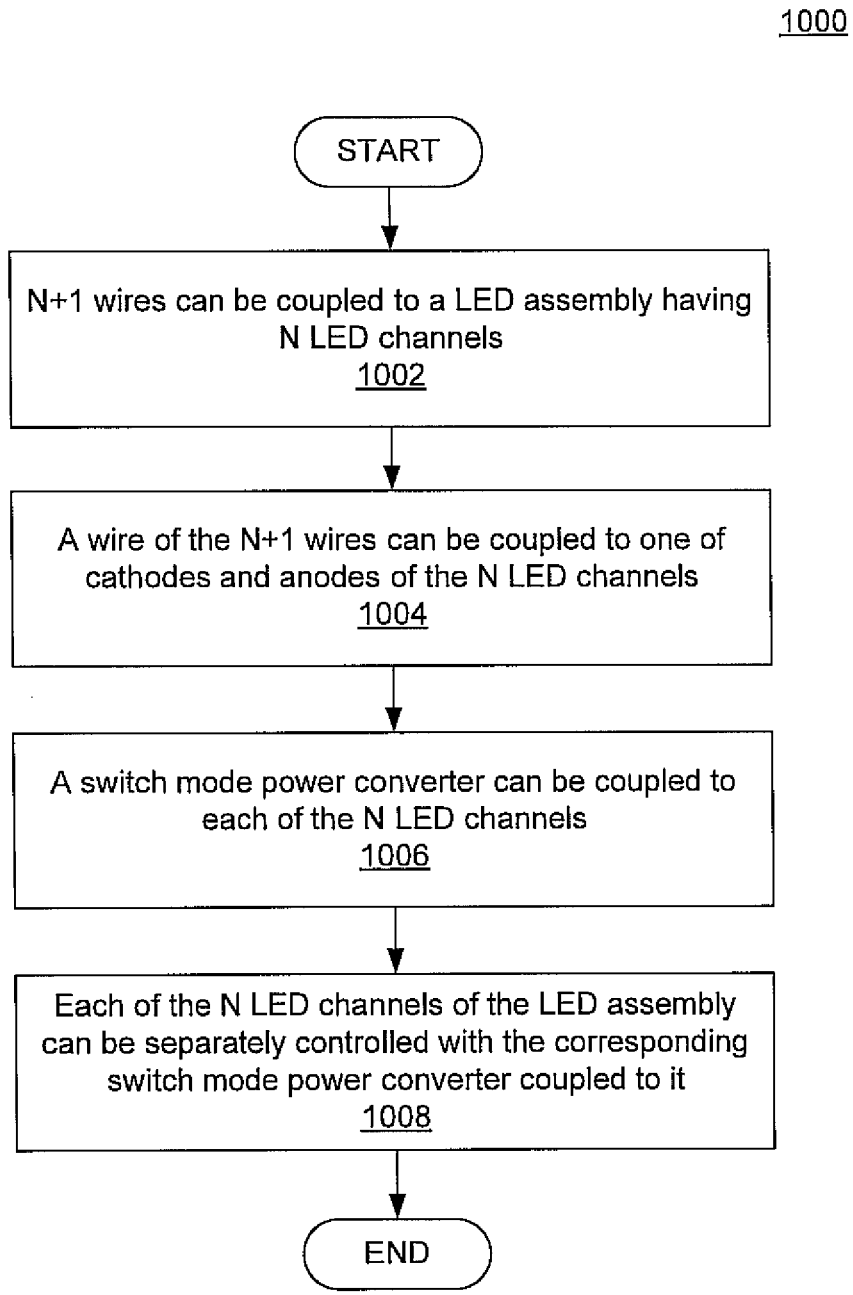
FIG. 10 a flow diagram of an exemplary method in accordance with various embodiments of the invention.

FIG. 10 is a flow diagram of a method 1000 in accordance with various embodiments of the invention. Method 1000 includes exemplary processes of embodiments of the invention which can be carried out by electronic circuitry. Although specific operations are disclosed in method 1000, such operations are exemplary. That is, method 1000 may not include all of the operations illustrated by FIG. 10. Also, method 1000 may include various other operations and/or variations of the operations shown by FIG. 10. Likewise, the sequence of the operations of method 1000 can be modified. It is noted that the operations of method 1000 can each be performed by software, by firmware, by electronic hardware, by electrical hardware, or by any combination thereof.

Specifically, method 1000 can include coupling N+1 wires to a light emitting diode (LED) assembly having N LED channels. A wire of the N+1 wires can be coupled to one of cathodes and anodes of the N LED channels. A switch mode power converter can be coupled to each of the N LED channels. Each of the N LED channels of the LED assembly can be separately controlled with the corresponding switch mode power converter coupled to it. Note that a switch mode power converter can also be referred to as a switch mode driver or as a switch mode driver circuit, but is not limited to such.

At operation 1002 of FIG. 10, N+1 wires can be coupled to a LED assembly (e.g., 104 or 614) having N LED channels (e.g., 106, 108, 110 or 616, 618, 620). It is pointed out that the operation 1002 can be implemented in a wide variety of ways. For example, operation 1002 can be implemented in any manner similar to that described herein, but is not limited to such.

At operation 1004, a wire (e.g., Vin 102 or ground 142) of the N+1 wires can be coupled to one of cathodes and anodes of the N LED channels. It is noted that the operation 1004 can be implemented in a wide variety of ways. For example, operation 1004 can be implemented in any manner similar to that described herein, but is not limited to such.

At operation 1006 of FIG. 10, a switch mode power converter (e.g., 150, 408, 622 or 808) can be coupled to each of the N LED channels. Note that the operation 1006 can be implemented in a wide variety of ways. For example, operation 1006 can be implemented in any manner similar to that described herein, but is not limited to such.

At operation 1008, each of the N LED channels of the LED assembly can be separately controlled with the corresponding switch mode power converter coupled to it. It is noted that the operation 1008 can be implemented in a wide variety of ways. For example, operation 1008 can be implemented in any manner similar to that described herein, but is not limited to such. At the completion of operation 1008, process 1000 can be exited or ended.

The foregoing descriptions of various specific embodiments in accordance with the invention have been presented for purposes of illustration and description. They are not intended to be exhaustive or to limit the invention to the precise forms disclosed, and many modifications and variations are possible in light of the above teaching. The invention is to be construed according to the Claims and their equivalents.

What is claimed is:

1. A circuit comprising:
   a light emitting diode (LED) assembly comprising a plurality of LED channels that are controlled independently, wherein each LED channel of said plurality of LED channels comprises a cathode and an anode;
   N+1 wires respectively coupled to N+1 terminals of said LED assembly, where N is equal to the number of said plurality of LED channels of said LED assembly, wherein one of said N+1 wires is coupled to an input terminal of said LED assembly, wherein the input terminal is coupled to said anodes of each LED channel of said plurality of LED channels, and wherein not more than said N+1 wires are coupled to said LED assembly; and
   a plurality of switch mode drivers, each switch mode driver coupled to a corresponding LED channel of said plurality of LED channels, wherein each switch mode driver comprises:
      a resistor coupled to an output terminal of said LED assembly, wherein said output terminal is coupled to a cathode of said corresponding LED channel;
      an inductor coupled to said resistor; and
      a switching element coupled to said inductor.

2. The circuit of claim 1, wherein each switch mode driver further comprises:
   a controller to output a temporal density function, wherein said switching element is coupled to receive said temporal density function.

3. The circuit of claim 2, wherein each switch mode driver further comprises:
   a sense amplifier coupled to said resistor, said sense amplifier coupled to said controller.

4. The circuit of claim 3, wherein each switch mode driver further comprises:
   a capacitor coupled to said resistor and said cathode.

5. A circuit comprising:
   a plurality of LED channels, each LED channel of said plurality of LED channels comprising a cathode and an anode;
   N+1 wires respectively coupled to N+1 terminals that are coupled to the plurality of LED channels, where N is equal to the number of said plurality of LED channels, wherein one of said N+1 wires is coupled to an input terminal of said N+1 terminals, wherein the input terminal is coupled to said anodes of each LED channel of said plurality of LED channels, and wherein not more than said N+1 wires are coupled to the plurality of LED channels; and
   a plurality of switch mode power converters each coupled to a corresponding LED channel of said plurality of LED channels, wherein each switch mode power converter comprises:
      a resistor coupled to an output terminal of said N+1 terminals, wherein said output terminal is coupled to an anode of said corresponding LED channel;
      an inductor coupled to said resistor; and
      a switching element coupled to said inductor.

6. The circuit of claim 5, wherein each switch mode power converter comprises:
   a controller to output a temporal density function.

7. The circuit of claim 6, wherein each switch mode power converter further comprises:
   a sense amplifier coupled to said LED channel, wherein said sense amplifier is coupled to said controller.

8. The circuit of claim 6, wherein each switching element is coupled to receive said temporal density function from said controller.

9. A method comprising:
   coupling not more than N+1 wires to respective N+1 terminals of a light emitting diode (LED) assembly having N LED channels, wherein each LED channel of said N LED channels comprises a cathode and an anode;
   coupling one of said N+1 wires to an input terminal of said LED assembly, wherein the input terminal is coupled to said anodes of each of said N LED channels;
   coupling each switch mode power converter of N switch mode power converters to a corresponding LED channel of said N LED channels, wherein each switch mode power converter comprises a resistor, an inductor, and a switching element, wherein said resistor and said inductor are coupled between said corresponding LED channel and said switching element; and
   separately controlling each LED channel of said LED assembly with a corresponding switch mode power converter based on a current flowing through said LED channel of said LED assembly.

10. The method of claim 9, wherein each of said resistors is coupled to an output terminal of said LED assembly, wherein said output terminal is coupled to a cathode of said corresponding LED channel.

11. The method of claim 9, wherein each of said switching elements is coupled to a respective controller for said corresponding LED channel, said controller configured to output a temporal density function.

* * * * *